US007122592B2

(12) United States Patent
Wentworth et al.

(10) Patent No.: US 7,122,592 B2
(45) Date of Patent: *Oct. 17, 2006

(54) ADHESION PROMOTERS FOR CORD-REINFORCED THERMOPLASTIC POLYMERIC MATERIALS AND SUBSTRATE/THERMOPLASTIC POLYMERIC MATERIAL COMPOSITES

(75) Inventors: Gary Wentworth, Chicago, IL (US); Zhi Chen, Memphis, TN (US); Stephen Semlow, Palos Park, IL (US); Stephen O'Rourke, Bolingbrook, IL (US); Kimberly L. Stefanisin, Oak Lawn, IL (US); John English, Oak Lawn, IL (US)

(73) Assignee: CPH Innovations Corp., Chicago, IL (US)

( * ) Notice: Subject to any disclaimer, the term of this patent is extended or adjusted under 35 U.S.C. 154(b) by 401 days.

This patent is subject to a terminal disclaimer.

(21) Appl. No.: 10/706,196

(22) Filed: Nov. 12, 2003

(65) Prior Publication Data

US 2004/0127615 A1 Jul. 1, 2004

Related U.S. Application Data

(63) Continuation-in-part of application No. 10/434,616, filed on May 9, 2003, now Pat. No. 6,858,664, and a continuation-in-part of application No. 10/435,212, filed on May 9, 2003, now Pat. No. 6,969,737, which is a continuation-in-part of application No. 10/301,770, filed on Nov. 21, 2002, now abandoned, which is a continuation-in-part of application No. 10/144,229, filed on May 10, 2002, now Pat. No. 6,884,832.

(51) Int. Cl.
*C08K 5/09* (2006.01)
*C08K 5/34* (2006.01)
*C08K 5/101* (2006.01)
*C08K 5/12* (2006.01)
*C08L 7/00* (2006.01)

(52) U.S. Cl. .................. 524/284; 524/100; 524/306; 524/311; 524/315; 156/60

(58) Field of Classification Search ............ 524/100, 524/284, 306, 311, 315; 156/60
See application file for complete search history.

(56) References Cited

U.S. PATENT DOCUMENTS

| | | | |
|---|---|---|---|
| 2,940,949 A | 6/1960 | Mullin et al. | 260/31.4 |
| 3,256,362 A | 6/1966 | Craubner et al. | 260/862 |
| 3,435,012 A | 3/1969 | Nordlander | 260/88.3 |
| 3,654,007 A | 4/1972 | Winstanley et al. | 156/132 |
| 3,825,515 A | 7/1974 | Lucas et al. | 260/31.8 M |
| 3,888,813 A | 6/1975 | Moult et al. | 260/343 |
| 3,951,887 A | 4/1976 | Tanimura et al. | 260/3 |
| 3,968,198 A | 7/1976 | Honda et al. | 264/343 |
| 3,968,295 A | 7/1976 | Solomon | 428/250 |
| 3,991,025 A | 11/1976 | Kutch et al. | 260/24 |
| 3,993,847 A | 11/1976 | Kondo | 428/451 |
| 4,016,119 A | 4/1977 | Elmer | 260/17.5 |
| 4,025,454 A | 5/1977 | Rouzier | 252/182 |
| 4,026,744 A | 5/1977 | Elmer | 156/110 A |
| 4,038,220 A | 7/1977 | Thompson | 260/3 |
| 4,054,561 A | 10/1977 | Strauss et al. | 260/22 D |
| 4,061,835 A | 12/1977 | Poppe et al. | 428/522 |
| 4,077,926 A * | 3/1978 | Sanderson et al. | 524/558 |
| 4,078,114 A | 3/1978 | Aronoff et al. | 428/379 |
| 4,130,535 A | 12/1978 | Coran et al. | 260/33.6 AQ |
| 4,134,869 A | 1/1979 | Kalafus et al. | 260/29.3 |
| 4,263,184 A * | 4/1981 | Leo et al. | 524/35 |
| 4,317,755 A | 3/1982 | Gregory | 524/276 |
| 4,376,711 A | 3/1983 | Shaub | 252/32.7 E |
| 4,435,477 A | 3/1984 | Davis | 428/462 |
| 4,448,813 A | 5/1984 | Solomon | 427/381 |
| 4,469,748 A | 9/1984 | Sharma | 428/378 |
| 4,472,463 A | 9/1984 | Solomon | 427/381 |
| 4,472,537 A | 9/1984 | Johnson et al. | 523/160 |
| 4,521,558 A | 6/1985 | Mowdood | 524/145 |
| 4,532,080 A | 7/1985 | Delseth et al. | 556/139 |
| 4,550,147 A | 10/1985 | Oohara | 525/332.6 |
| 4,574,142 A | 3/1986 | Charnock | 525/305 |
| 4,588,761 A | 5/1986 | Thoma et al. | 524/38 |
| 4,605,590 A | 8/1986 | Delseth et al. | 428/295 |
| 4,605,693 A | 8/1986 | Mowdood | 524/239 |
| 4,645,788 A | 2/1987 | Okumoto et al. | 524/308 |
| 4,681,961 A | 7/1987 | Zerpner et al. | 556/428 |

(Continued)

FOREIGN PATENT DOCUMENTS

CA 2408772 4/2003

(Continued)

OTHER PUBLICATIONS

International Search Report in PCT/US03/35856, dated Jul. 21, 2004.

(Continued)

*Primary Examiner*—Vasu Jagannathan
*Assistant Examiner*—Sandra Poulos
(74) *Attorney, Agent, or Firm*—Marshall, Gerstein & Borun LLP

(57) ABSTRACT

A thermoplastic polymeric material composition including a thermoplastic polymeric material selected from the group consisting of a thermoplastic polymer and a thermoplastic polymer alloy, an adhesive resin, and a long chain ester, particularly dimerate and trimerate esters, is capable of unexpected adhesion to substrates such as natural fabric substrates, synthetic polymeric fabric substrates, metal substrates, and thermoplastic polymeric material substrates, particularly natural cords, synthetic polymeric cords, metal cords, and glass cords for use in cord-reinforced articles such as hoses, conveyor belts, transmission belts, and the like.

58 Claims, No Drawings

U.S. PATENT DOCUMENTS

| | | | | |
|---|---|---|---|---|
| 4,683,250 | A | 7/1987 | Mikami | 522/33 |
| 4,699,792 | A | 10/1987 | Nick et al. | 424/446 |
| 4,704,334 | A | 11/1987 | Delseth et al. | 428/458 |
| 4,776,909 | A | 10/1988 | Bohm et al. | 156/117 |
| 4,785,033 | A | 11/1988 | Mowdood | 524/86 |
| 4,789,381 | A | 12/1988 | Oshiyama et al. | 8/115.6 |
| 4,859,215 | A | 8/1989 | Langsam et al. | 55/16 |
| 4,978,392 | A | 12/1990 | Kilbarger et al. | 106/95 |
| 4,978,716 | A | 12/1990 | Flynn et al. | 525/195 |
| 5,057,566 | A | 10/1991 | Kobayashi et al. | 524/297 |
| 5,107,069 | A | 4/1992 | Wichelhaus et al. | 524/314 |
| 5,169,716 | A | 12/1992 | Croft et al. | 428/379 |
| 5,185,189 | A | 2/1993 | Stenger et al. | 428/34.8 |
| 5,226,987 | A | 7/1993 | Matsumoto et al. | 152/209 R |
| 5,246,051 | A | 9/1993 | Inada et al. | 152/527 |
| 5,253,691 | A | 10/1993 | Scriver | 152/537 |
| 5,290,886 | A | 3/1994 | Ellul | 524/515 |
| 5,298,539 | A | 3/1994 | Singh et al. | 524/92 |
| 5,428,089 | A | 6/1995 | Ishikawa et al. | 524/188 |
| 5,447,776 | A | 9/1995 | Disselbeck | 524/178 |
| 5,455,075 | A | 10/1995 | Longo | 427/398.1 |
| 5,571,352 | A | 11/1996 | Disselbeck | 152/526 |
| 5,604,277 | A | 2/1997 | Osborn | 524/270 |
| 5,605,955 | A | 2/1997 | Hirai | 524/588 |
| 5,616,657 | A | 4/1997 | Imamura et al. | 525/437 |
| 5,712,039 | A * | 1/1998 | Marhevka et al. | 428/414 |
| 5,777,014 | A * | 7/1998 | Hopper et al. | 524/308 |
| 5,792,805 | A | 8/1998 | Williams | 524/100 |
| 5,834,582 | A | 11/1998 | Sinclair et al. | 528/354 |
| 5,891,938 | A | 4/1999 | Williams | 524/100 |
| 5,900,448 | A | 5/1999 | Wideman et al. | 524/419 |
| 5,973,045 | A | 10/1999 | Dowling et al. | 524/270 |
| 5,985,963 | A | 11/1999 | D'Sidocky et al. | 524/105 |
| 6,127,512 | A | 10/2000 | Asrar et al. | 528/272 |
| 6,138,731 | A | 10/2000 | Miyazaki et al. | 152/532 |
| 6,211,262 | B1 | 4/2001 | Mejiritski et al. | 522/71 |
| 6,255,367 | B1 | 7/2001 | Bitler et al. | 523/522 |
| 6,262,180 | B1 | 7/2001 | Klun et al. | 525/199 |
| 6,326,426 | B1 | 12/2001 | Ellul | 524/270 |
| 6,423,767 | B1 | 7/2002 | Weber et al. | 524/158 |
| 6,429,244 | B1 | 8/2002 | Rinka et al. | 524/186 |
| 6,858,664 | B1 * | 2/2005 | Wentworth et al. | 524/315 |
| 6,884,832 | B1 * | 4/2005 | Wentworth et al. | 524/306 |
| 6,969,737 | B1 * | 11/2005 | Wentworth et al. | 524/306 |
| 2002/0010275 | A1 | 1/2002 | Maly et al. | 525/177 |
| 2003/0166743 | A1 * | 9/2003 | Huynh-Tran et al. | 523/205 |
| 2003/0171471 | A1 | 9/2003 | Pritschins et al. | 524/306 |
| 2004/0122145 | A1 * | 6/2004 | Klosowski et al. | 524/284 |
| 2004/0127616 | A1 * | 7/2004 | Wentworth et al. | 524/284 |
| 2005/0194752 | A1 * | 9/2005 | Klosowski et al. | 277/650 |

FOREIGN PATENT DOCUMENTS

| | | |
|---|---|---|
| EP | 0 073 174 A1 | 3/1983 |
| EP | 0 704 491 | 4/1996 |
| EP | 1 022 306 A1 | 7/2000 |
| FR | 2 417 522 | 9/1979 |
| GB | 1 045 577 | 10/1966 |
| GB | 2 022 089 | 12/1979 |
| JP | 06223316 | 4/1996 |
| WO | WO 03/095550 A1 | 11/2003 |

OTHER PUBLICATIONS

Mechanics of Pneumatic Tires, Clark, National Bureau of Standards Monograph 112, U.S. Dept. of Commerce, pp. 241-243 and 290-291 (Nov. 1971).

Peterson et al., Resorcinol Bonding Systems for Steel Cord Adhesion, Rubber World, pp. 24-27 (Aug. 1984).

* cited by examiner

ADHESION PROMOTERS FOR CORD-REINFORCED THERMOPLASTIC POLYMERIC MATERIALS AND SUBSTRATE/THERMOPLASTIC POLYMERIC MATERIAL COMPOSITES

CROSS REFERENCE TO RELATED APPLICATIONS

This is a continuation-in-part of U.S. patent application Ser. No. 10/434,616, filed May 9, 2003 now U.S. Pat. No. 6,858,664, and U.S. patent application Ser. No. 10/435,212, filed May 9, 2003 now U.S. Pat. No. 6,969,737, which are both continuation-in-parts of U.S. patent application Ser. No. 10/301,770, filed Nov. 21, 2002 now abandoned, and U.S. patent application Ser. No. 10/144,229, filed May 10, 2002 now U.S. Pat. No. 6,884,832, the entire respective disclosures of which are hereby incorporated by reference.

FIELD OF THE INVENTION

The present invention is directed to adhesion promoters for adhering thermoplastic polymeric materials, including thermoplastic polymers and thermoplastic polymer alloys, to substrates, such as natural fabric substrates, glass substrates, synthetic polymeric fabric substrates, metal substrates and thermoplastic polymeric material substrates, particularly natural fabric cords, glass cords, synthetic polymeric cords, and metal cords.

BACKGROUND OF THE INVENTION

Thermoplastic polymeric materials, including thermoplastic polymers and thermoplastic polymer alloys, can generally be processed using conventional plastics techniques, such as extrusion and injection molding. Because such processing techniques are advantageous for manufacturing, thermoplastic polymeric materials are used in a wide variety of applications including, for example, the manufacture of cord-reinforced polymeric articles such as hoses, conveyor belts, power train belts, transmission belts, and the like.

In every such cord-reinforced thermoplastic polymeric article, the cord or fiber should be firmly bonded to the thermoplastic polymeric material. This is so whether the fiber is a natural or synthetic polymer, or metallic, and whether the thermoplastic polymeric material is a thermoplastic polymer or a thermoplastic polymer alloy.

The manufacture of cord-reinforced rubber-based articles, such as tires, is well known. The conventional practice for manufacturing such cord-reinforced rubber-based articles has been to prepare the fiber by pretreatment with a combination of hexamethoxymelamine or hexamethylene-tetramine and a phenol-formaldehyde condensation product, wherein the phenol is almost always resorcinol. By a mechanism not completely understood, the resin reacts with the fiber and the rubber, effecting a firm reinforcing bond. Additionally, an increased need in the industry for fiber reinforcing of rubber to survive high dynamic stresses, such as flexing, for example, to avoid tire belt separation, has brought about a continuing search for other and better compositions and methods for achieving high adhesive strength between reinforcing fibers and rubber.

In view of the development of many thermoplastic polymeric materials which provide desirable physical properties similar to rubbers, i.e., softness, flexibility, and resilience, and the processing advantages of such thermoplastic polymeric materials, other and better compositions and methods for promoting adhesion between thermoplastic polymeric materials and substrates such as reinforcing fibers are similarly needed.

SUMMARY OF THE INVENTION

In brief, it has been found that long chain esters formed by reacting mono, di-, and/or tri-carboxylic acids containing one, two, or three $C_6$–$C_{24}$ long chain radicals or fatty acid residues, and alcohols containing a $C_3$–$C_{24}$ alkyl group, when added with an adhesive resin, such as a melamine-containing resin or a phenol-, e.g., resorcinol-containing resin, e.g., a novolak resin, unexpectedly increases adhesion between thermoplastic polymeric materials, such as thermoplastic polymers and thermoplastic polymer alloys, and a substrate, for example, cords or fibers used as reinforcing elements in hoses, conveyor belts, automotive drive train belts, including transmission belts, and the like.

Surprisingly good adhesion between thermoplastic polymeric materials and various substrates has been obtained by adding an adhesive resin and one or more long chain mono-, di-, and/or tri-esters, particularly dimerate esters reacted from $C_{18}$ fatty acids and $C_3$–$C_{24}$ alcohols, preferably $C_3$–$C_{18}$ alcohols, more preferably $C_6$–$C_{18}$ alcohols. Preferably, the esters provide unexpected, tenacious bonding between the thermoplastic polymeric material and the substrate, when combined with an adhesive resin. It is theorized that the long chain esters of the invention strongly adhere both to the thermoplastic polymeric material and to the resin, with the resin providing sufficient ionic bonding to the reinforcing cords.

Examples of suitable substrates include metals such as steel, brass-coated steel, copper, brass and aluminum, synthetic polymers such as polyester and Aramid, synthetic textiles, natural textiles, glass, thermoplastic polymeric materials and the like. Application of the adhesive promoters of the invention is also contemplated with metal cords such as steel cord, brass-coated steel cord and brass cord, synthetic polymeric cords such as polyester fiber cord and Aramid fiber cord, natural cords such as glass cord and cotton fiber cord, natural fabric substrates, synthetic polymeric fabric substrates, flat metal surfaces (or substrates), thermoplastic polymeric material substrates and the like.

One aspect of the invention provides cord-reinforced articles comprising a thermoplastic polymeric material, the article being characterized by good adhesion between the reinforcing cords or fibers and the thermoplastic polymeric material. Another aspect of the invention provides methods of adhering a thermoplastic polymeric material to a substrate.

DETAILED DESCRIPTION OF THE PREFERRED EMBODIMENTS

As used herein, the term "adhesion promoter system" refers to the combination of at least one long chain ester compound and at least one adhesive resin. The adhesion promoter systems of the invention are useful for improving the adhesion of thermoplastic polymeric materials to various metal and polymeric substrates, particularly glass, metal and polymeric cords. Surprisingly, the adhesion promoter systems disclosed herein significantly increase the adhesion of thermoplastic polymeric material compositions to such metal and polymeric substrates. In the description, the terms "adhesion promoter system" and "adhesion promoter" may be used interchangeably.

As used herein, the term "thermoplastic polymeric materials" refers to polymeric materials which can generally be processed using conventional plastics techniques, such as extrusion and injection molding. Typically, such thermoplastic polymeric materials are selected from thermoplastic polymers and thermoplastic polymer alloys.

In the adhesion promoter systems of the invention, long chain esters are typically added to thermoplastic polymeric materials with an adhesive resin. The adhesion promoter systems may be added to a thermoplastic polymeric material(s) as a liquid in order to promote adhesion of the thermoplastic polymeric material to a substrate. For example, the adhesive resin(s) and long chain ester(s) can be solubilized in one or more suitable organic solvents. Alternatively, the adhesive resin(s) and long chain ester(s) can be emulsified in water with one or more suitable emulsifying agents to form a water-based emulsion.

The water-based emulsions should have an HLB value of about 4 to about 5 for best ester dispersion in the emulsion. In liquid form, the adhesion promoter has a number of advantages, particularly the ability to coat a substrate, such as a metal or polymeric substrate, with the liquid ester/resin adhesion promoter for adherence of an thermoplastic polymeric material to the substrate, without changing the composition thermoplastic polymeric material. Other advantages include (1) the ability to prepare a relatively high concentration solution of the adhesion promoter, e.g., 50–90% by weight of the adhesion promoter, which can be diluted upon addition to a thermoplastic polymeric material composition or upon substrate coating; (2) the ability to include excess alcohol, e.g., 2-ethylhexanol, during the synthesis of the long chain ester portion of the liquid adhesion promoter, for use as a solvent for solubilizing the resin portion of the liquid adhesion promoter. The use of excess alcohol during the synthesis of the esters is particularly advantageous for ester synthesis since the esterification reaction proceeds faster with excess alcohol. Since the excess alcohol is useful in solubilizing the resin, the excess alcohol can remain with the synthesized ester without removing much, or any, of the excess alcohol in an ester concentration or purification step.

The liquid adhesion promoter, whether solubilized in an organic liquid or emulsified in a water-based emulsion, can be added to the thermoplastic polymeric material composition for adhesion to a substrate, e.g., a metal, polymeric layer, film, or fibrous, e.g., fabric, substrate, or can be used to pre-treat, e.g., coat, the substrate, e.g., a metal or a polymeric layer, film, fibrous or fabric substrate for adhesion of the thermoplastic polymeric material thereto.

In accordance with another embodiment of the present invention, it has also been found that the addition of one or more reactive organic solvents (reactive diluents) to the rubber compositions described herein, in addition to a solvent used to solubilize the adhesive resin, or as a replacement for any portion, or all of, the resin solvent, unexpectedly increases the adhesion of the rubber composition to substrates such as polymeric cord, metal cord, polymeric fabric, and metal, particularly cords in the manufacture of cord-reinforced rubber articles, such as tires, hoses, conveyor belts, transmission belts, and the like.

Examples of suitable reactive diluents include (1) glycidyl ethers, (2) diglycidyl ethers; (3) aliphatic, straight chain epoxides; (4) epoxidized vegetable oils, particularly epoxidized soybean oil; (5) cycloaliphatic epoxies; (6) glycidyl esters, and (7) diglycidyl esters.

(1) Glycidyl ethers generally have a structural formula as follows:

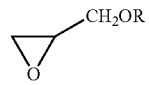

where R=alkyl (methyl, ethyl, butyl, isobutyl, and the like), alkyl containing one or more olefinic bonds, or aryl (phenyl, toluyl, benzyl, and the like) these are reaction products of epichlorohydrin with methanol, ethanol, isopropanol, n-butanol, 1-octanol, 2-ethylhexanol, n-decanol, isooctanol, isodecanol, oleyl alcohol, benzyl alcohol, or any other alcohol, as well as mixtures of alcohols, for example, a mixture of n-octyl and n-decyl.)

Examples include 2-ethylhexyl glycidyl ether; allyl glycidyl ether; dodecyl glycidyl ether; decyl glycidyl ether; iso-butyl glycidyl ether; n-butyl glycidyl ether; naphthyl glycidyl ether; tridecyl glycidyl ether; phenyl glycidyl either; 2-ethylhexyl glycidyl ether; C8–C10 aliphatic glycidyl ether; p-tertiary butyl phenyl glycidyl ether; nonyl phenyl glycidyl either; and phenyl glycidyl ether;

(2) Diglycidyl ethers generally have a structural formula as follows:

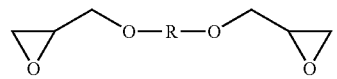

Where R=a straight chain or branched aliphatic moiety, for example $(CH_2)_n$, where n=2–10, or $-CH_2-CH(CH_3)CH_2-$ or $-CH_2-C(CH_3)_2-CH_2-$, or the like. These are reaction products of epichlorohydrin with a diol or mixtures of diols, such as ethylene glycol, propylene glycol, 1,4-butylene glycol, 1,3-butylene glycol, 1,6-hexanediol, 2-methyl-1,3-propanediol, 2,2-dimethyl-1,3-propanediol, or mixtures. R can also be an aromatic moiety, resulting in an epoxy structure that is the reaction product of glycidol with common bisphenols such as bisphenol A and bisphenol F.

Examples include 1,6-hexanediol diglycidyl ether; bisphenol A diglycidyl ether; neopentyl glycol diglycidyl ether; 1,4 butanediol diglycidyl either; cyclohexanedimethanol diglydidyl ether; polypropylene glycol diglycidyl ether; polyethyleneglycol diglycidyl ether; dibromo neopentyl glycol diglycidyl ether; trimethylopropane triglycidyl ether; castor oil triglycidyl ether; propoxylated glycerin triglycidyl ether; and sorbitol polyclycidyl either.

(3) Aliphatic, straight chain epoxides have a general structural formula as follows:

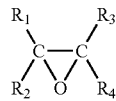

Examples include propylene oxide, butylene oxide, as well as the following:

| R$_1$ | R$_2$ | R$_3$ | R$_4$ |
|---|---|---|---|
| CH$_2$=CH | H | H | H |
| C$_3$H$_7$ | H | H | H |
| (CH$_3$)$_2$CH | H | H | H |
| C$_5$H$_{11}$ | H | H | H |
| C$_6$Hl$_3$ | H | H | H |
| (CH$_3$)$_2$CH(CH$_2$)$_3$ | H | H | H |
| C$_8$H$_{17}$ | H | H | H |
| C$_{16}$H$_{33}$ | H | H | H |
| C$_{18}$H$_{37}$ | H | H | H |
| C$_6$H$_5$ | H | H | H |
| C$_6$H$_5$CH$_2$ | H | H | H |
| C$_6$H$_5$(CH$_2$)$_2$ | H | H | H |
| C$_6$H$_5$(CH$_2$)$_3$ | H | H | H |
| C$_5$H$_5$(CH$_2$)$_4$ | H | H | H |
| CH$_2$OH | H | H | H |
| CH$_3$OCH$_2$ | H | H | H |
| C$_2$H$_5$OCH$_2$ | H | H | H |
| C$_3$H$_7$CHOH | H | H | H |
| C$_6$H$_5$OCH$_2$ | H | H | H |
| CH$_3$CO$_2$CH$_2$ | H | H | H |
| CH$_2$=CHCO$_2$CH$_2$ | H | H | H |
| CH$_2$=C(CH$_3$)—CO$_2$CH$_2$ | H | H | H |
| CH$_3$CH=CH—CO$_2$CH$_7$ | H | H | H |
| Br | H | H | H |
| CH$_2$F | H | H | H |
| CH$_2$Cl | H | H | H |
| CH$_2$Br | H | H | H |
| CH$_2$I | H | H | H |
| CF$_3$ | H | H | H |
| CCl$_3$ | H | H | H |
| (C$_2$H$_5$)$_2$NCH$_2$ | H | H | H |
| C$_2$H$_5$ | H | C$_2$H$_5$ | H |
| C$_2$H$_5$ | H | CF$_3$ | H |
| C$_2$H$_5$ | H | C$_3$F$_7$ | H |
| C$_4$H$_9$ | H | CH$_2$Br | H |
| C$_5$H$_{11}$ | H | Cl | H |
| C$_6$H$_5$ | H | CH$_3$ | H |
| C$_6$H$_5$ | H | C$_2$H$_5$ | H |
| C$_6$H$_5$ | H | C$_3$H$_7$ | H |
| C$_6$H$_5$ | H | C$_3$H$_7$ (iso) | H |
| C$_6$H$_5$ | H | C$_6$H$_5$CH$_2$ | H |
| CF$_3$ | H | F | H |
| CH$_3$ | CH$_3$ | CH$_3$ | H |
| CH$_3$ | C$_2$H$_5$ | CH$_3$ | H |
| CH$_3$ | CH$_3$ | C$_3$F$_7$ | H |
| CH$_3$ | CH$_3$ | CO$_2$C$_2$H$_5$ | H |
| CH$_3$ | CF$_3$ | Cl | H |
| C$_2$H$_5$ | C$_2$H$_5$ | OH$_3$ | H |
| CH$_3$ | CH$_3$ | CH$_3$ | CH$_3$ |
| CH$_3$ | CH$_3$ | H | H |
| CH$_3$ | CF$_3$ | H | H |
| CH$_3$ | C$_2$H$_5$ | H | H |
| CH$_3$ | C$_3$F$_7$ | H | H |
| C$_2$H$_5$ | CH$_2$Br | H | H |
| C$_6$H$_5$ | CH$_3$ | H | H |
| C$_6$H$_5$(CH$_2$)$_3$ | CH$_3$ | H | H |
| C$_6$H$_5$ | OH | H | H |
| Cl | Cl | H | H |
| CH$_3$ | H | CH$_3$(cis) | H |
| CH$_3$ | H | H | CH$_3$(trans) |
| CH$_3$ | H | C$_2$H$_5$(cis) | H |
| CH$_3$ | H | H | C$_2$H$_6$(trans) |
| CH$_3$ | H | C$_3$H$_7$ | H |
| CH$_3$ | H | C$_3$H$_7$(iso) | H |
| CH$_3$ | H | CF$_3$ | H |
| CH$_3$ | H | CH$_2$Br | H |
| CH$_3$ | H | C$_3$F$_7$ | H |
| CH$_3$ | H | CO$_2$H | H |

(4) Epoxidized oils such as epoxidized soybean oil, epoxidized linseed oil, epoxidized safflower oil, epoxidized corn oil, epoxidized cottonseed oil, epoxidized rapeseed oil, epoxidized peanut oil, and other similar species derived from epoxidation of C$_{18}$ unsaturated esters of glycerin.

(5) Cycloaliphatic epoxies, such 1,2-cyclohexene oxide, 1,2-cyclopentene oxide, 1,2,3,4,-diepoxybutene, vinylcyclohexene dioxide, and the like, as well as those products marketed by Shell Oil under the brand name EPON®, an example of which is shown below.

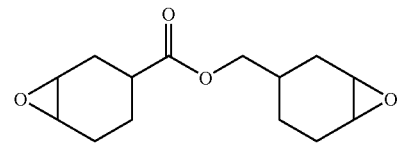

(6) Glycidyl esters generally have a structural formula as follows:

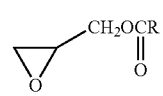

Where R=straight chain aliphatic, such as —(CH$_2$)$_n$—CH$_3$ (n=1–9) or branched aliphatic such as —CH$_2$CH(CH$_3$)$_2$ and —CH(CH$_2$CH$_3$)(CH$_2$)$_4$CH$_3$. R can also be straight chain aliphatic, containing one or more olefinic bonds. R can also be aromatic, i.e., -phenyl or -toluyl. These glycidyl esters are reaction products of glycidol with carboxylic acids, such as acetic acid, propionic acid, isobutyric acid, 2-ethylhexoic acid, benzoic acid, toluic acid (various isomers), oleic acid, linoleic acid, linolenic acid, as well as mixtures of carboxylic acids.

Examples include glycidyl neodecanoate; acetic acid glycidyl ester; butyric acid glycidyl ester; propionic acid glycidyl ester; valeric acid glycidyl ester; caproic acid glycidyl ester; capric acid glycidyl ester; caprylic acid glycidyl ester; lauric acid glycidyl ester; and glycidyl ester of linoleic acid or of linolenic acid.

(7) Diglycidyl esters generally have a structural formula as follows:

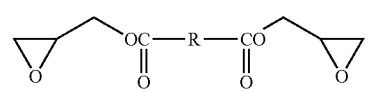

Where R=straight chain aliphatic, —(CH$_2$)$_n$ (n=1–8) or branched aliphatic, or aliphatic/cycloaliphatic mixed, or aliphatic containing one or more olefinic bonds. R can also be aromatic. These diglycidyl esters are reaction products of glycidol with dicarboxylic acids such as malonic acid, glutaric acid, adipic acid, azelaic acid, sebacic acid, phthalic anhydride, isophthalic acid, terephthalic acid, and one or more dimer acids.

In the reactive diluent embodiment described herein, the reactive diluent is typically included in an amount between about 0.5% and about 50% by weight, usually between about 5 wt. % and about 40 wt. %, and most preferably between about 10 wt. % and about 30 wt. %, based on the total weight of adhesion promoter (i.e., adhesive resin plus ester) in the composition. These reactive diluents function as solvents to compatibilize the thermoplastic polymeric material, adhesive resin, and long chain ester compositions described herein are believed to participate chemically in the adhesion of the thermoplastic polymeric material composition to the substrates described herein.

In another embodiment, the substrate can be pretreated with the resin component of the adhesion promoter system (known in the art as an "isocyanate pretreatment"). The resin-treated substrate can subsequently be treated with the ester component of the adhesion promoter system for improved adherence of the thermoplastic polymeric material to the substrate. The resin-treated substrate can be ester treated in any manner, preferably by dipping or coating the resin-treated substrate with an organic solution of the ester or a water-based emulsion containing the ester.

The adhesion promoter systems can also be mixed with a preferably inert, dry carrier, such as calcium silicate, to form an alternative delivery system, which can be incorporated into thermoplastic polymeric material(s). In such systems, the dry, inert carrier facilitates delivery of the active adhesion promoting agents to the thermoplastic polymeric material(s).

For example, a representative adhesion promoter system utilizing a dry carrier, RX-13845, was prepared by adding preheated Cyrez CRA 138 resin liquid to a dry carrier (substrate) contained in a mixing bowl, followed by addition of preheated RX-13804. The materials were mixed at low speed for 3 minutes. The materials were blended for an additional 3 minutes. RX-13845 permits liquids to be handled as powders. Because the active adhesion promoter is released is released from the carrier, incorporation of RX-13845 into a thermoplastic polymeric material composition allows the adhesion promoter to function in the same manner as if it had been incorporated into thermoplastic polymeric material composition as a neat material.

In yet another refinement of the invention, the adhesion promoters may be formulated as a "polymer masterbatch." According to this aspect of the invention, a pellet comprising a polymer (about 6 wt. % to about 20 wt. %), a filler or other similar inert ingredients (about 0 wt. % to about 14 wt. %), with the balance being an adhesion promoter system (i.e., at least one ester compound in accordance with formulas I–IV and at least one adhesive resin such as melamine) is added to a thermoplastic polymeric material to improve adhesion of the material to a substrate. Typically, the masterbatch polymer and the thermoplastic polymeric material to which the masterbatch polymer is added are miscible. Preferably, the masterbatch polymer and the thermoplastic polymeric material are the same.

Throughout the specification, the adhesion promoter systems are generally used in an amount between about 0.2% by weight and about 30% by weight. Typically, the ester and adhesive resin components of an adhesion promoter system of the invention are both present in an amount between about 0.1% and about 15% by weight, usually between about 1 wt. % and about 10 wt. %, and most preferably between about 2 wt. % and about 8 wt. %, based on the weight of thermoplastic polymeric material in the composition.

Ranges may be expressed herein as from "about" or "approximately" one particular value to "about" or "approximately" another particular value. When such a range is expressed, another embodiment includes the range from the one particular value to the other particular value. Similarly, when numerical values are expressed as approximations, e.g., by use of the antecedent "about," it will be understood that the particular value forms another embodiment.

The long chain esters may be monoesters, diesters, triesters, or mixtures thereof, that may include saturated or unsaturated hydrocarbon chains, straight chain or branched, having none, one, two or three double bonds in the hydrocarbon chains.

The monoesters have a formula I, as follows:

wherein $R^1$ is a $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds; and, $R^2$ is a $C_3$–$C_{24}$ hydrocarbon, preferably $C_6$–$C_{24}$ hydrocarbon, more preferably $C_8$–$C_{18}$ hydrocarbon, saturated or unsaturated having 1 to 6, preferably 1 to 3 carbon-to-carbon double bonds.

The diesters have a formula II or III, as follows:

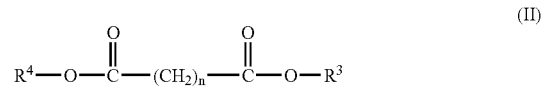

wherein n=3–24, preferably 6–18, and more preferably 3–10, and $R^3$ and $R^4$, same or different, are $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds.

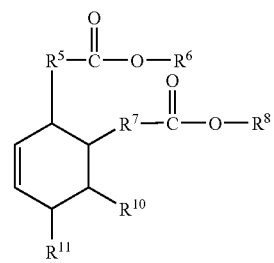

wherein $R^5$ and $R^7$, same or different, are $C_3$–$C_{24}$ alkyl, preferably $C_6$–$C_{24}$ alkyl, more preferably $C_8$–$C_{18}$ alkyl, straight chain or branched, either saturated or containing 1 to 6, preferably 1 to 3 carbon-to-carbon double bonds;

$R^6$ and $R^8$, same or different, are $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds; and $R^{10}$ and $R^{11}$, same or different, are $C_3$–$C_{24}$ saturated hydrocarbon chains, preferably $C_3$–$C_{18}$ saturated hydrocarbon chains, more preferably $C_6$–$C_{18}$ saturated hydrocarbon chains, straight chain or branched; or unsaturated $C_3$–$C_{24}$ hydrocarbon chains, preferably $C_3$–$C_{18}$ unsaturated hydrocarbon chains, more preferably $C_6$–$C_{18}$ unsaturated hydrocarbon chains, straight chain or branched, containing 1 to 6, preferably 1 to 3 carbon-to-carbon double bonds.

The triesters have a formula IV, as follows:

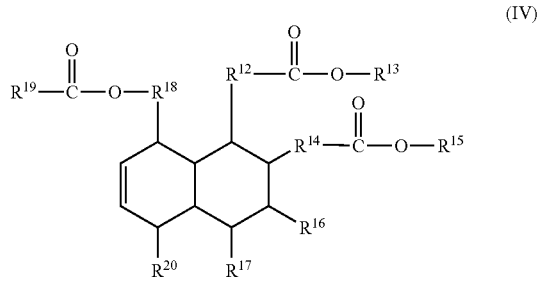

wherein $R^{12}$, $R^{14}$ and $R^{18}$, same or different, are $C_3$–$C_{24}$ alkyl preferably $C_6$–$C_{24}$ alkyl more preferably $C_8$–$C_{18}$ alkyl, straight chain or branched, either saturated or containing 1 to 6, preferably 1 to 3 carbon-to-carbon double bonds;

$R^{13}$, $R^{15}$ and $R^{19}$, same or different, are $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds; and $R^{16}$, $R^{17}$ and $R^{20}$, same or different, are $C_3$–$C_{24}$ saturated hydrocarbon chains, preferably $C_3$–$C_{18}$ saturated hydrocarbon chains, more preferably $C_6$–$C_{18}$ saturated hydrocarbon chains, straight chain or branched; or unsaturated $C_3$–$C_{24}$ hydrocarbon chains, preferably $C_3$–$C_{18}$ unsaturated hydrocarbon chains, more preferably $C_6$–$C_{18}$ unsaturated hydrocarbon chains, straight chain or branched, containing 1 to 6, preferably 1 to 3 carbon-to-carbon double bonds.

The fatty acid residues or hydrocarbon chains $R^2$, $R^5$, $R^7$, $R^{12}$, $R^{14}$ and $R^{18}$ of the esters of formulas I, II, III, and IV can be any $C_3$–$C_{24}$ hydrocarbon chain, preferably any $C_6$–$C_{24}$ hydrocarbon chain, more preferably any $C_8$–$C_{18}$ hydrocarbon chain, either saturated or containing 1 to 6, preferably 1 to 3 carbon-to-carbon double bonds, and can be derived from animal or vegetable fatty acids such as butter; lard; tallow; grease; herring; menhaden; pilchard; sardine; babassu; castor; coconut; corn; cottonseed; jojoba; linseed; oiticica; olive; palm; palm kernel; peanut; rapeseed; safflower; soya; sunflower; tall; and/or tung. Examples are the hydrocarbon chain residues from the following fatty acids, where the number in parentheses indicates the number of carbon atoms, and the number of double bonds, e.g., ($C_{24-6}$) indicates a hydrocarbon chain having 24 carbon atoms and 6 double bonds: Hexanoic ($C_{6-0}$); Octanoic ($C_{8-0}$); Decanoic ($C_{10-0}$); Dodecanoic ($C_{12-0}$); 9-Dodecenoic (CIS) ($C_{12-1}$); Tetradecanoic ($C_{14-0}$); 9-Tetradecenoic (CIS) ($C_{14-1}$); Hexadecanoic (CIS) ($C_{16-0}$); 9-Hexadecenoic (CIS) ($C_{16-1}$); Octadecanoic ($C_{18-0}$); 9-Octadecenoic (CIS) ($C_{18-1}$); 9-Octadecenoic, 12-Hydroxy-(CIS) ($C_{18-2}$); 9, 12-Octadecadienoic (CIS, CIS) ($C_{18-2}$); 9, 12, 15 Octadecatrienoic (CIS, CIS, CIS) ($C_{18-3}$); 9, 11, 13 Octadecatrienoic (CIS, TRANS, TRANS) ($C_{18-3}$); 9, 11, 13 Octadecatrienoic, 4-Oxo (CIS, TRANS, TRANS) ($C_{18-3}$); Octadecatetrenoic ($C_{18-4}$); Eicosanoic ($C_{20}$); 11-Eicosenoic (CIS) ($C_{20-1}$); Eicosadienoic ($C_{20-2}$); Eicosatrienoic ($C_{20-3}$); 5, 8, 11, 14 Eicosatetraenoic ($C_{20-4}$); Eicosapentaenoic ($C_{20-5}$); Docosanoic ($C_{22}$); 13 Docosenoic (CIS) ($C_{22-1}$); Docosatetraenoic ($C_{22-4}$); 4, 8, 12, 15, 19 Docosapentaenoic ($C_{22-5}$); Docosahexaenoic ($C_{22-6}$); Tetracosenoic ($C_{24-1}$); and 4, 8, 12, 15, 18, 21 Tetracosahexaenoic ($C_{24-6}$).

Examples of particularly useful diesters of formula II include a saturated diester formed by the reaction of sebacic acid and 2-ethylhexyl alcohol:

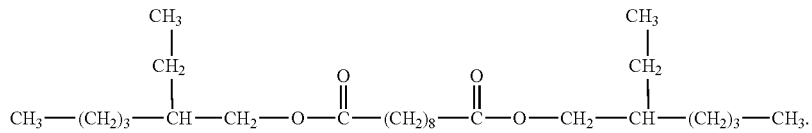

Other useful diesters falling within formula II include the saturated diester formed by the reaction of sebacic acid with tridecyl alcohol,

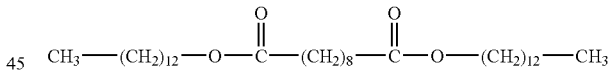

and the unsaturated diester formed by reaction of sebacic alcohol with oleyl alcohol:

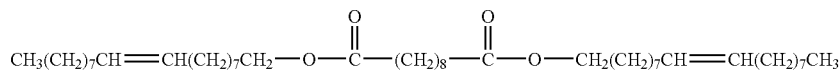

Useful cyclic diesters falling within formula III include dimerate ester structures formed by the reaction of a $C_{36}$ dimer acid derived from tall oil fatty acids and $C_3$–$C_{24}$, preferably $C_3$–$C_{18}$, more preferably $C_6$–$C_{18}$ alcohol, straight chain or branched, saturated or unsaturated containing 1 to 3 carbon-to-carbon double bonds. Examples of such cyclic esters include the following structures, wherein the dimer acid corresponding to structure A is formed by self reaction of linoleic acid, the dimer acid corresponding to structure B is formed by reacting linoleic acid with oleic acid, and the dimer acid corresponding to structure C is formed by reacting linoleic acid with linolenic acid:

(A)
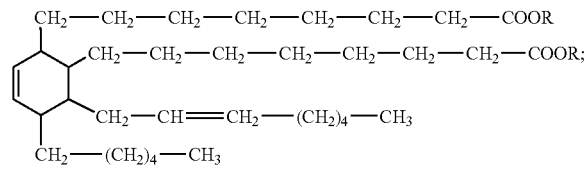

(B)
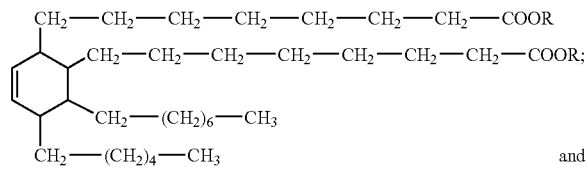

and (C)
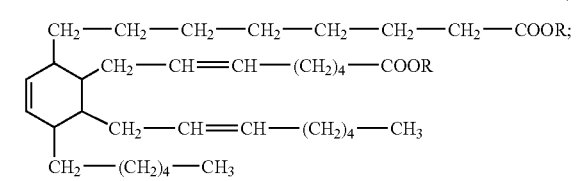

wherein each R, same or different, in formulas (A), (B), and (C) is a $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds. Another example of a useful unsaturated diester (dimerate ester) is formed by the reaction of a predominantly $C_{36}$ dimer acid reacted with 2-ethylhexyl alcohol. An additional useful unsaturated diester (dimerate ester) is formed by the reaction of a predominantly $C_{36}$ dimer acid with tridecyl alcohol.

A representative example of the triester (trimerate ester) of formula IV is the following structure (D):

(D)
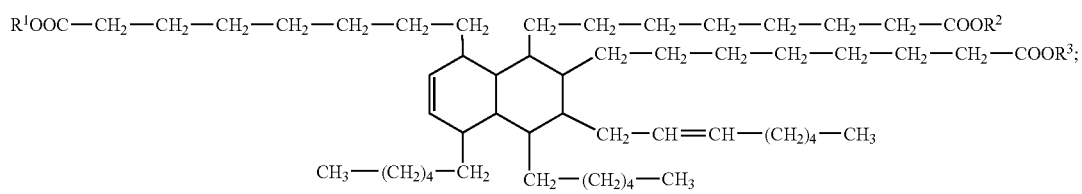

wherein each $R^1$, $R^2$, and $R^3$, same or different, is a $C_3$–$C_{24}$ radical, preferably $C_3$–$C_{18}$, more preferably $C_6$–$C_{18}$, straight chain, or branched, saturated or unsaturated containing 1 to 3 carbon-to-carbon double bonds.

A particularly useful blend of long chain esters is formed from blends of mono, dimer, and trimer acids, for example, products having CAS#: 61788-89-4. Esters prepared from such products are blends including, primarily, the above $C_{36}$ and $C_{54}$ dimerate and trimerate esters (A), (B), (C) and (D), shown in the above structures, that is predominantly (more than 50% by weight) the $C_{36}$ dimerate esters (A), (B) and (C).

Commercially available blends of useful polybasic acids that can be reacted with $C_3$–$C_{24}$, preferably $C_3$–$C_{18}$, more preferably $C_6$–$C_{18}$ alcohols, straight chain or branched, saturated or unsaturated containing 1 to 3 carbon-to-carbon double bonds to produce the dimerate and trimerate esters, as blends, include the following: EMPOL® 1010 Dimer Acid; EMPOL® 1014 Dimer Acid; EMPOL® 1016 Dimer Acid; EMPOL® 1018 Dimer Acid; EMPOL® 1022 Dimer Acid; EMPOL® 1024 Dimer Acid; EMPOL® 1040 Trimer Acid; EMPOL® 1041 Trimer Acid; EMPOL® 1052 Polybasic Acid; and similar PRIPOL™ products from Uniqema as well as UNIDYME® products from Arizona Chemical.

Particularly useful long chain ester additives are made by reacting any of the long chain mono, dimer and/or trimer acids with one or more straight chain or branched $C_3$–$C_{24}$, preferably $C_3$–$C_{18}$, more preferably $C_6$–$C_{18}$ alcohols to produce the esters of formulas I, II, III and IV. The above dimer, trimer, and polybasic acids are produced by dimerizing, trimerizing, and polymerizing (oligomerizing) long chain carboxylic acids, particularly from the above-mentioned tall oil fatty acids. Tall oil fatty acids are often mixtures. Accordingly, the dimer acid produced by dimerizing a $C_{18}$ carboxylic acid (typically, a mixture of stearic, oleic, linoleic, and linolenic), after esterification, typically provides a blend of numerous dimerate and trimerate esters in accordance with formulas III and IV, including saturated and unsaturated esters (i.e., some long chain esters may contain hydrocarbon chains having 1 to 6, generally 1 to 3, carbon-to-carbon double bonds). Any one, or any blend, of the esters of formulas I, II, III and/or IV, when combined with an adhesive resin, will function to increase the adhesion of thermoplastic polymeric materials to metal cords, polymeric cords, metal substrates, polymeric substrates including woven polymeric fabrics and non-woven polymeric fabrics, other metal substrates such as metal flat stock materials, and other thermoplastic polymeric materials.

The adhesion promoters include an adhesive resin, which preferably is a condensation product of a formaldehyde or methylene donor and a formaldehyde or methylene acceptor, either pre-condensed, or condensed in-situ while in contact with the thermoplastic polymeric material. The term "methylene donor" is intended to mean a compound capable of reacting with a methylene acceptor (such as resorcinol or its equivalent containing a reactive hydroxyl group) and generate the resin outside of the thermoplastic polymeric material composition, or in-situ. Preferably, the components of the condensation product include a methylene acceptor and a methylene donor. The most commonly employed methylene acceptor is a phenol, such as resorcinol, while the most commonly employed methylene donor is a melamine, such as N-(substituted oxymethyl)melamine.

Examples of methylene donors which are suitable for use in the thermoplastic polymeric material compositions disclosed herein include melamine, hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde, such as paraformaldehyde. In addition, the methylene donors may be N-substituted oxymethylmelamines, of the general formula:

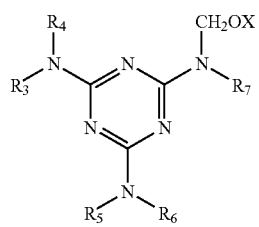

wherein X is an alkyl having from 1 to 8 carbon atoms $R^3$, $R^4$, $R^5$, $R^6$ and $R^7$ are individually selected from the group consisting of hydrogen, an alkyl having from 1 to 8 carbon atoms and the group —$CH_2OX$. Specific methylene donors include hexakis(methoxymethyl)melamine; N,N',N"'trimethyl/N,N',N"-trimethylolmelamine; hexamethylolmelamine; N,N',N"-dimethylolmelamine; N-methylolmelamine; NN'-dimethylolmelamine; N,N',N"-tris (methoxymethyl)melamine; and N,N',N"-tributyl-N,N',N"-trimethylol-melamine. The N-methylol derivatives of melamine are prepared by known methods.

The amount of methylene donor and methylene acceptor, pre-condensed or condensed in-situ, that are present in the thermoplastic polymeric material composition may vary. Typically, the amount of pre-condensed methylene donor and methylene acceptor is present will range from about 0.1 wt. % to about 15.0 wt. %; or each can be added separately in an amount of about 1 wt. % to about 10.0 wt. %, based on the weight of thermoplastic polymeric material in the composition. Preferably, the amount of each of a methylene donor and methylene acceptor added for in-situ condensation ranges from about 2.0 wt. % to about 8.0 wt. %, based on the weight of thermoplastic polymeric material in the composition. The weight ratio of methylene donor to the methylene acceptor may vary. Generally speaking, the weight ratio will range from about 1:10 to about 10:1. Preferably, the weight ratio ranges from about 1:3 to 3:1.

Resorcinol-free adhesive resins also are useful in the thermoplastic polymeric material compositions described herein. For example, resorcinol-free adhesive resins and adhesive compounds useful in the adhesion promoter systems (i.e., when combined with the long chain esters described herein) include those described in U.S. Pat. Nos. 5,891,938 and 5,298,539, both hereby incorporated by reference. The '938 patent discloses a self-condensing alkylated triazine resin having high imino and/or methylol functionality. U.S. Pat. No. 5,298,539 discloses additives which are substituted derivatives based on cyclic nitrogen compounds such as melamine, acetoguanamine, cyclohexylguanamine, benzoguanamine, and similar alkyl, aryl or aralkyl substituted melamines, glycoluril and oligomers of these compounds. In particular, the adhesive resins and adhesive compounds which are useful as the adhesive resins in the thermoplastic polymeric material compositions described herein include the following: adhesive resins selected from the group consisting of derivatives of melamine, acetoguanamine, benzoguanamine, cyclohexylguanamine and glycoluril monomers and oligomers of these monomers, which have been substituted on average at two or more positions on the monomer or on each unit of the oligomer with vinyl terminated radicals, the thermoplastic polymeric material composition being free of resorcinol; and, these derivatives which have been further substituted on average at one or more positions with a radical which comprises carbamylmethyl or amidomethyl.

Further, the adhesive resin can be any of the compounds of the following formulas:

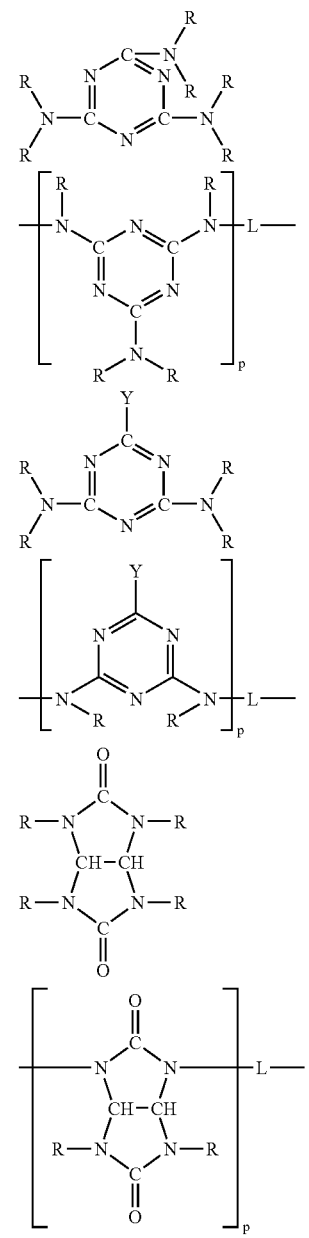

and positional isomers thereof, wherein, in each monomer and in each polymerized unit of the oligomers, Y is selected from methyl, phenyl and cyclohexyl, and, on average, at least two R are —$CH_2$—$R^1$, and any remaining R are H, and
at least 2 $R^1$ are radicals selected from:

$CH_2=C(R^2)-C(O)-O-$, $CH_2=C(R^2)-C(O)-Z$, $CH_2=C(R^2)-C(O)-NH-$, and $CH_2=C(R^2)-CH_2-O-$, wherein $R^2$ is hydrogen or $C_1-C_{18}$ alkyl, and Z is a radical selected from:

$-O-CH_2-CH_2-O-$, $-O-CH_2-CH(CH_3)-O-$, $-O-CH_2-CH_2-CH_2O-$, and $-O-CH(C_2H_5)-O-$, and any remaining $R^1$ radicals are selected from $-O-R_3$, $-NH-C(O)-OR^4$, and $-NH-C(O)-R^4$, and wherein $R_3$ is hydrogen or $R_4$, and
$R_4$ is a $C_1-C_{18}$ alkyl, alicyclic, hydroxyalkyl, alkoxyalkyl or aromatic radical, and in the oligomers,
P is 2 to about 10, and
L is methylene or the radical $-CH_2-O-CH_2-$.

These adhesive compounds are particularly useful, wherein on average at least one $R^1$ in each monomer or in each oligomerized unit is $-NH-C(O)-OR^4$, particularly the compounds of the following formulas:

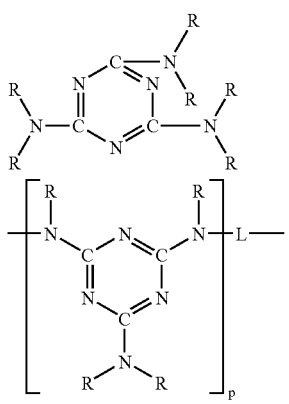

Particularly useful adhesive resins include the above formulas wherein on average, at least one R radical in each monomer or in each oligomerized unit is $-CH_2-NH-C(O)-OR^4$, wherein $R^4$ is a $C_1-C_{18}$ alkyl, alicyclic, hydroxyalkyl, alkoxyalkyl or aromatic radical, and wherein, on average, at least two R radicals are selected from $CH_2=C(CH_3)-C(O)O-C_3H_6-O-CH_2-$ and $CH_2=CH_2-C(O)O-C_2H_4-O-CH_2-$ and at least one R radical is selected from $-CH_2-NH-C(O)-O-CH_3$, and $-CH_2-NH-C(O)-O-C_3H_7$.

These adhesive resins and compounds can include additional additives, particularly those selected from hydroxymethylated and alkoxymethylated (alkoxy having 1–5 carbon atoms) derivatives of melamine, acetoguanamine, benzoguanamine, cyclohexylguanamine and glycoluril and their oligomers.

Additional adhesive resins useful in the thermoplastic polymeric material compositions described herein include self-condensing alkylated triazine resins selected from the group consisting of (i), (ii), and (iii):

(i) a self-condensing alkylated triazine resin having at least one of imino or methylol functionality and represented by the formula (I)

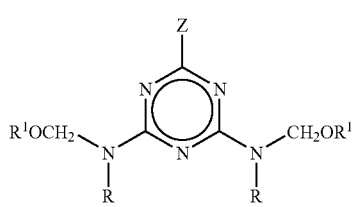

(ii) an oligomer of (i), or
(iii) a mixture of (i) and (ii), wherein
Z is $-N(R)(CH_2OR^1)$, aryl having 6 to 10 carbon atoms, alkyl having 1 to 20 carbon atoms or an acetyl group,
each R is independently hydrogen or $-CH_2OR^1$, and
each $R^1$ is independently hydrogen or an alkyl group having 1 to 12 carbon atoms,
provided that at least one R is hydrogen or $-CH_2OH$ and at least one $R^1$ is selected from the alkyl group; and
wherein the thermoplastic polymeric material composition is substantially free of methylene acceptor coreactants.

These adhesive resins are particularly useful wherein at least one R group is hydrogen and/or wherein at least one $R^1$ group is a lower alkyl group having 1 to 6 carbon atoms, particularly where the adhesive resin is a derivative of melamine, benzoguanamine, cyclohexylguanamine, or acetoguanamine, or an oligomer thereof.

One particularly useful alkylated triazine adhesive resin of the above formula is wherein Z is $-N(R)(CH_2OR^1)$.

Another manner of eliminating resorcinol in an adhesive resin for the thermoplastic polymeric material compositions disclosed herein, is to use N-(substituted oxymethyl) melamine and at least one of α- or β-naphthol. This adhesive resin employs the monohydric phenols, α- or β-naphthol, as methylene acceptors in the resin forming reaction in the absence of resorcinol.

Other adhesive resins useful in the thermoplastic polymeric material compositions described herein include special latices such as, for example, a vinyl-pyridine latex (VP latex) which is a copolymer of about 70 wt. % butadiene, about 15 wt. % styrene and about 15 wt. % 2-vinylpyridine; acrylonitrile rubber latices; and styrene-butadiene rubber latices. These can be used as such or in combination with one another. Another suitable adhesive resin useful herein, particularly for polyesters, are those which are applied in multi-stage processes, for instance a blocked isocyanate being applied in combination with polyepoxide and the material then being treated using customary resorcinol-formaldehyde resins (RFL dip). Additional useful adhesive resins include combinations of RFL dips with other adhesion-promoting substances such as, for example, a reaction product of triallyl cyanurate, resorcinol and formaldehyde or p-chlorophenol, resorcinol and formaldehyde.

Other suitable adhesive resins include polyurethane resins, epoxy resins, phenol aldehyde resins, polyhydric phenol aldehyde resins, phenol furfural resins, xylene aldehyde resins, urea formaldehyde resins, melamine formaldehyde resins, alkyd resins, polyester resins, and the like.

Typically, in the adhesion promoter systems, at least one ester compound in accordance with formulas I–IV is combined with an adhesive resin in a weight ratio between about 10 parts ester to about 1 part adhesive resin (i.e., a ratio of about 10:1, ester to resin, respectively) and about 1 part ester to about 10 parts resin (i.e., a ratio of about 1:10, ester to resin, respectively). More preferably, the esters are combined with an adhesive resin in a weight ratio between about 4 parts ester to about 1 part adhesive resin and about 1 part ester to about 4 parts resin. Most preferably, the ratio of ester to adhesive resin is approximately one to one.

As previously described, the adhesion promoter systems can be used to adhere thermoplastic polymeric materials to various substrates. Typically, such thermoplastic polymeric materials are selected from thermoplastic polymers and thermoplastic polymer alloys. Particularly, the thermoplastic polymeric material compositions described herein are characterized in that the surfaces of the thermoplastic polymeric material compositions are improved to provide a high adhering ability to various substrates.

As used herein, "thermoplastic polymers" generally include synthetic high polymers that soften when exposed to heat and return to their original state when cooled to room temperature. More specifically, thermoplastic polymers which may be adhered to various substrates using the adhesion promoter systems described herein include polyvinyl chloride, nylons, propylene/α-olefin copolymers, polyolefins such as polyethylene and polypropylene, ethylene/α-olefin copolymers such as, for example, ethylene/propylene copolymers and ethylene/1-octene copolymers, polyurethane prepolymers, polystyrenes such as styrene/ethylene block copolymers and hydrogenated styrene/butadiene block copolymers, cellulosic resins, acrylic resins, and combinations thereof. Preferably, the adhesion promoter systems and methods are used to adhere thermoplastics such as polyvinyl chloride, polypropylene, propylene/α-olefin copolymers, ethylene/α-olefin copolymers, block copolymers of styrene with ethylene, hydrogenated styrene/butadiene block copolymers, and combinations thereof to various substrates. Most preferably, the adhesion promoter systems described herein are used to adhere thermoplastic polymeric materials comprising polyvinyl chloride, ethylene/1-octene copolymers or polypropylene blended with ethylene/propylene copolymers. Some thermoplastics may be referred to as thermoplastic elastomers because of their physical properties.

The term "thermoplastic polymer alloy" as used herein refers to compositions comprising a thermoplastic polymer, as defined herein, and a second component. The second component is typically an elastomer, for example, a natural or synthetic rubber. Accordingly, the term thermoplastic polymer alloy includes thermoplastic vulcanizates and thermoplastic elastomers, as these terms are conventionally understood. The elastomer component can be vulcanized but this is not necessary. If the elastomer component is vulcanized, a suitable vulcanizing agent for vulcanizing the elastomer component can be added to the composition.

Rubbers useful in the thermoplastic polymer alloy compositions described herein can be natural rubbers (NR) and/or synthetic rubbers. Synthetic rubbers include homopolymers of conjugated diene compounds, such as isoprene, butadiene, chloroprene and the like, for example, polyisoprene rubber (IR), polybutadiene rubber (BR), polychloroprene rubber and the like; copolymers of the above described conjugated diene compounds with vinyl compounds, such as styrene, acrylonitrile, vinyl pyridine, acrylic acid, methacrylic acid, alkyl acrylates, alkyl methacrylates and the like, for example, styrene-butadiene copolymeric rubber (SBR), vinylpyridine-butadiene-styrene copolymeric rubber, acrylonitrile-butadiene copolymeric rubber, acrylic acid-butadiene copolymeric rubber, methacrylic acid-butadiene copolymeric rubber, methyl acrylate-butadiene copolymeric rubber, methyl methacrylate-butadiene copolymeric rubber, acrylonitrile-butadiene-styrene terpolymer, and the like; copolymers of olefins, such as ethylene, propylene, isobutylene and the like with dienes, for example isobutylene-isoprene copolymeric rubber (IIR); copolymers of olefins with non-conjugated dienes (EPDM), for example, ethylene-propylene-cyclopentadiene terpolymer, ethylene-propylene-5-ethylidene-2-norbomene terpolymer and ethylene-propylene-1,4-hexadiene terpolymer; polyalkenamer obtained by ring opening polymerization of cycloolefins, for example, polypentenamer; rubbers obtained by ring opening polymerization of oxirane ring, for example, polyepichlorohydrin rubber and polypropylene oxide rubber which can be vulcanized with sulfur, silicone rubbers, and the like. Furthermore, halides of the above-described various rubbers, for example, chlorinated isobutylene-isoprene copolymeric rubber (CI-IIR), brominated isobutylene-isoprene copolymeric rubber (Br-IIR), fluorinated polyethylene, and the like are included. Of course, the present invention can be applied to other rubbers. All these rubbers may be kneaded with compounding agents conventionally used for compounding with rubber, for example, fillers, such as carbon black, silica, calcium carbonate, lignin and the like, softening agents, such as mineral oils, vegetable oils, prior to vulcanization and then vulcanized.

The thermoplastic polymeric material compositions described herein can be compounded by methods generally known, such as mixing the thermoplastic polymeric materials with various commonly used additive materials such as, for example, processing additives, such as oils, resins including tackifying resins and plasticizers, fillers, pigments, fatty acids, waxes and antioxidants.

The adhesion promoter systems of the invention are useful for improving the adhesion of thermoplastic polymeric materials to various metal and polymeric substrates, particularly glass, metal and polymeric cords. Thermoplastic polymeric materials, the surface of which has been treated with the adhesion promoter systems described herein, can be easily adhered to the other materials, particularly metals and polymers, particularly in cord form.

Substrates which are contemplated for use in the inventive compositions and methods include metal and polymeric layers, films, sheets, fibers, yarns and/or fabrics, including textiles, polyesters, and Aramid fibers. Adhesion of a first thermoplastic polymeric material composition to a second thermoplastic polymeric material composition is also contemplated. Metals for use, in the invention include steel, brass-coated steel, brass, copper and aluminum. Adhesion to glass substrates, including glass cord, can also be improved. Application of the adhesion promoters of the invention is particularly contemplated with metal cords such as steel cord, brass-coated steel cord, brass cord, polyester fiber cord, Aramid fiber cord, glass cord, flat fabric surfaces, flat metal surfaces, and the like. In the present application the term polymeric "cord" or "cords" is intended to include reinforcing elements used in thermoplastic polymeric material products including fibers, continuous filaments, yarns, fabrics and the like, particularly cords for use in manufacturing cord-reinforced articles.

Reinforcing cords comprising a plurality of substantially continuous fibers or monofilaments, including glass compositions, polyesters, polyamides and a number of other materials, are useful for the reinforcing cords for thermoplastic polymeric material compositions and products, and are well known in the art. One of the preferred glasses to use is a glass known as E glass and is described in "Mechanics of Pneumatic Tires," Clark, National Bureau of Standards Monograph 122, U.S. Dept. of Commerce, issued November 1971, pages 241–243, 290 and 291, which is hereby incorporated herein by reference. The number of filaments or fibers employed in the reinforcing cord can vary considerably depending on the ultimate use or service requirements.

The adhesive promoters of the invention can be used in numerous applications, including bonding steel braid fibers to the thermoplastic polymeric material of hoses.

The adhesion promoters described herein are very effective in promoting bonding between thermoplastic polymeric material and brass, for example between a thermoplastic polymeric material and brass-coated steel. The brass typically has a copper content of from 60 to 70% by weight, more especially from 63 to 68% by weight, with the optimum percentage depending on the particular conditions under which the bond is formed. The brass coating on brass-coated steel can have a thickness of, for example, from 0.05 to 1 micrometer, preferably from 0.07 to 0.7 micrometer, for example from 0.15 to 0.4 micrometer.

The long chain ester additive/resin combinations (i.e., adhesion promoter systems) described herein are also particularly useful to adhere thermoplastic polymeric material to steel cord, where conventional adhesive pretreatment has been largely ineffective. Thermoplastic polymeric material can also be bonded effectively to alloys of copper and zinc containing small amounts of one or more other metals, for example cobalt, nickel or iron.

For bonding thermoplastic polymeric material to zinc, as for example in bonding thermoplastic polymeric material to zinc-coated steel cords (which are widely used in the manufacture of conveyor belting), cobalt compounds have been used as adhesion promoters. Examples of such compounds are cobalt naphthenate and the cobalt-boron complexes described in GB 2 022 089 A. Use of such additional adhesion promoters is also contemplated in conjunction with the adhesion promoter systems of the invention.

The invention may be better understood by reference to the following examples in which parts and percentages are by weight unless otherwise indicated.

EXAMPLES

Table I compares the effectiveness of adhesion promoter systems comprising dimerate esters in accordance with the disclosure in promoting adhesion of a representative thermoplastic polymeric material (polyester polyurethane) to various fabric substrates. More specifically, according to this example, representative adhesion promoters were evaluated for promoting polyester polyurethane adhesion to cord or fabric. Additionally, whereas RX-13928 is a liquid system, RX-13845 and RX-13946 are adhesion promoter systems consisting of 36 wt. % RX-13804, 36 wt. % resin (either Cyrez CRA-138 Resin or Resimene 3520, both liquids at room temperature), and 28% substrate (synthetic calcium silicate).

The results demonstrate a significant improvement in adhesion of a thermoplastic polymeric material (a polyester polyurethane compound) to untreated polyester fibers, isocyanate treated polyester fibers, untreated aramid fibers, isocyanate treated aramid fibers, untreated nylon fibers, and isocyanate treated nylon fibers. The data is set forth in Table I, Examples 1–4.

TABLE I

|  | Example 1 | Example 2 | Example 3 | Example 4 |
|---|---|---|---|---|
| Millathane 76 | 100.0 | ⟶ | | |
| Rhenosin 260 | 1.0 | ⟶ | | |
| TAC | 0.5 | ⟶ | | |
| Stearic Acid | 0.5 | ⟶ | | |
| Hisil 233 | 30.0 | ⟶ | | |
| Mistron Vapor | 20.0 | ⟶ | | |
| Epolene N-34 | 1.0 | ⟶ | | |
| Plasthall DBEEA | 15.0 | ⟶ | | |

TABLE I-continued

|  | Example 1 | Example 2 | Example 3 | Example 4 |
| --- | --- | --- | --- | --- |
| Rhenopren EPS | 5.0 | → | → | → |
| Varox DBPH-50 | 3.0 | → | → | → |
| RX-13928 | — | 4.7 | — | — |
| RX-13946 | — | — | 5.6 | — |
| RX-13845 | — | — | — | 5.6 |
| TOTAL | 176.0 | 180.7 | 181.6 | 181.6 |
| Major Variable | Control | RX-13928 | RX-13946 | RX-13845 |
| Processing Properties |  |  |  |  |
| Viscosity and Curing Properties |  |  |  |  |
| Mooney Viscosity at 275° F. (135° C.) |  |  |  |  |
| Minimum Viscosity | 24.1 | 17.7 | 20.0 | 13.3 |
| t5, minutes | 12.2 | 14.3 | 12.7 | 17.7 |
| t10, minutes | 14.3 | 18.0 | 15.2 | 21.8 |
| t35, minutes | >60 | 51.3 | 37.3 | >60 |
| Oscillating Disc Rheometer at 340° F. (171° C.) |  |  |  |  |
| $M_L$ | 6.3 | 5.2 | 5.7 | 5.9 |
| $M_H$ | 38.8 | 32.3 | 34.1 | 44.4 |
| $t_s2$, minutes | 1.4 | 1.5 | 1.4 | 1.3 |
| t'c(90), minutes | 4.2 | 4.6 | 4.6 | 6.2 |
| 1.25*t'c(90), minutes | 5.2 | 5.7 | 5.7 | 7.7 |
| T-100 | 10.3 | 11.3 | 10.9 | 17.6 |
| Cure Rate Index | 11.3 | 10.3 | 10.5 | 6.2 |
| Vulcanizate Properties |  |  |  |  |
| Sheets & Pads for Physical properties were cured at T-100 Time |  |  |  |  |
| Original Physical Properties |  |  |  |  |
| Stress @ 100% Elongation, MPa | 3.5 | 3.0 | 3.2 | 3.9 |
| psi | 505 | 440 | 465 | 560 |
| Stress @ 200% Elongation, MPa | 5.9 | 5.1 | 5.2 | 6.4 |
| Stress @ 300% Elongation, MPa | 11.9 | 8.7 | 8.9 | 12.2 |
| Tensile Ultimate, MPa | 13.6 | 15.5 | 15.2 | 13.2 |
| psi | 1975 | 2245 | 2210 | 1915 |
| Elongation @ Break, % | 310 | 405 | 400 | 310 |
| Hardness Duro A, pts. 15s/1 sec | 68/73 | 62/68 | 63/67 | 66/72 |
| Specific Gravity | 1.376 | 1.364 | 1.372 | 1.373 |
| Yarn Adhesion |  |  |  |  |
| Untreated POLYESTER 174S |  |  |  |  |
| Average Adhesion Force, lbf/in width | 0.00 | 8.87 | 6.94 | 7.42 |
| Beaverloc 108 Polyester 174S |  |  |  |  |
| Average Adhesion Force, lbf/in width | 0.00 | 18.14 | 10.11 | 9.16 |
| Untreated Aramid Acordis Twaron 1008 |  |  |  |  |
| Average Adhesion Force, lbf/in width | 5.04 | 7.82 | 6.33 | 5.87 |
| Beaverloc 102 Twaron Aramid |  |  |  |  |
| Average Adhesion Force, lbf/in width | 3.4 | 8.22 | 4.38 | 6.41 |
| Untreated Nylon |  |  |  |  |
| Average Adhesion Force, lbf/in width | 3.35 | 5.67 | 4.57 | 6.15 |
| Treated Nylon |  |  |  |  |
| Average Adhesion Force, lbf/in width | 4.42 | 7.36 | 6.20 | 6.01 |

Table II compares the effectiveness of adhesion promoter systems comprising dimerate esters in accordance with the disclosure in promoting adhesion of a representative thermoplastic polymeric material (polyvinyl chloride) to various fabric substrates. More specifically, according to this example, representative adhesion promoters were evaluated for promoting polyvinyl chloride adhesion to cord or fabric.

The results demonstrate a significant improvement in adhesion of a thermoplastic polymeric material (a polyvinyl chloride compound) to untreated polyester fibers and isocyanate treated polyester fibers. The data is set forth in Table II, Examples 5–8.

TABLE II

|  | Example 5 | Example 6 | Example 7 | Example 8 |
|---|---|---|---|---|
| Geon 121 | 100.0 | → | | |
| Thermchek 904 | 3.0 | → | | |
| PARAPLEX G-62 | 10.0 | → | | |
| PARAPLEX A-8000 50/Plasthall BBP 50 | 100.0 | → | | |
| RX-13928 | 4.7 | — | — | — |
| RX-13939 | — | 5.0 | — | — |
| RX-13943 | — | — | 4.6 | — |
| TOTAL | 217.7 | 218 | 217.6 | 213 |
| Major Variable | RX-13928 | RX-13939 | RX-13943 | Control |
| Original Physical Properties | | | | |
| Stress @ 100% Elong. MPa | 2.7 | 2.7 | 2.7 | 3.1 |
| psi | 385 | 395 | 395 | 445 |
| Stress @ 200% Elong. MPa | 4.5 | 4.5 | 4.5 | 5 |
| Stress @ 300% Elong. MPa | 6.6 | 6.6 | 6.6 | 7.3 |
| Tensile Strength, MPa | 9.6 | 9.2 | 9.3 | 10.9 |
| psi | 1390 | 1330 | 1350 | 1585 |
| Elongation @ Break, % | 445 | 425 | 445 | 460 |
| Hardness Duro A, pts. | 44 | 43 | 39 | 40 |
| Specific Gravity | 1.208 | 1.208 | 1.208 | 1.213 |
| Yarn Adhesion | | | | |
| Untreated POLYESTER 174S | | | | |
| Average Adhesion Force, lbf/in width | 10.32 | 13.99 | 9.48 | 6.0 |
| Beaverloc 102 - POLYESTER 174S | | | | |
| Average Adhesion Force, lbf/in width | 4.19 | 9.78 | 10.11 | 5.8 |

Table III compares the effectiveness of adhesion promoter systems comprising dimerate esters and reactive diluents in accordance with the disclosure in promoting adhesion of a representative thermoplastic polymeric material (polyvinyl chloride) to various fabric substrates. More specifically, according to this example, representative adhesion promoters were evaluated for polyvinyl chloride adhesion to cord or fabric.

The results demonstrate a significant improvement in adhesion of a thermoplastic polymeric material (a polyvinyl chloride compound) to untreated polyester fibers and isocyanate treated polyester fibers. The data is set forth in Table III, Examples 9–11.

TABLE III

|  | Example 9 | Example 10 | Example 11 |
|---|---|---|---|
| OV240 F | 100.0 | → | |
| ThermChek SP0350 | 2.0 | → | |
| PARAPLEX G-62 | 5.0 | → | |
| PARAPLEX A-8000 | 67.0 | → | |
| RX-13977 | 7.1 | — | — |
| RX-13978 | — | 7.1 | — |
| Control | — | — | — |
| TOTAL | 181.1 | 181.1 | 174.0 |
| Major Variable | RX-13977 | RX-13978 | CRTL |
| Original Physical Properties | | | |
| Stress @ 100% Elong. MPa | 5.1 | 5.7 | 6.2 |
| psi | 745 | 830 | 905 |
| Stress @ 200% Elong. MPa | 8.4 | 9.6 | 10.2 |
| Stress @ 300% Elong. MPa | 11.4 | 12.7 | 13.3 |
| Tensile Strength, MPa | 14.8 | 16.5 | 16.4 |
| psi | 2150 | 2390 | 2380 |
| Elongation @ Break, % | 415 | 415 | 400 |
| Hardness Duro A, pts. | 63 | 62 | 63 |
| Specific Gravity | 1.230 | 1.232 | 1.241 |
| Yarn Adhesion | | | |
| Untreated POLYESTER 174S | | | |
| Average Adhesion Force, lbf/in width | 4.1 | 4.3 | 3.0 |
| Beaverloc 102 - POLYESTER 174S | | | |
| Average Adhesion Force, lbf/in width | 5.1 | 4.6 | 3.1 |

Method of Measuring Cord Adhesion

Adhesion promoter systems were evaluated to determine their effect on adhesion of cords to thermoplastic polymeric materials, when combined with an adhesive resin. The following method was used to determine the relative strip-peel adhesion of reinforcing fibers, including natural and manmade filaments and spun yarns, to various thermoplastic polymeric materials. This method is conventionally used with industrial weight fibers of 500 denier or greater.

The adhesion testing described herein was performed in accordance with ASTM D 4393-85 "Strap Peel Adhesion of Reinforcing Cords or Fabrics to Rubber Compounds."

Typically, 1"×5" strips of fiber/thermoplastic polymeric materials were prepared for testing. Fibers were positioned onto a tape backing using a rotatable cylinder. The tape backing was applied to a thermoplastic polymeric material under high temperature and pressure in a hydraulic press (i.e., at curing, extruding, or other conditions) to form a cord- or fabric-reinforced composite material. The composite was then cut into strips for adhesion measurements (e.g., through separation load values, appearance, etc.).

Procedure

An ASTM 429 mold was placed in a compression press (capable of achieving temperatures between 250° F. and about 400° F., and a pressure of about 125 tons) and the temperature was set at temperature sufficient to melt the thermoplastic material, e.g., about 340° F. The press was maintained within the specified temperature range for about 30 minutes.

Three strips of 3" wide masking tape (a suitable masking tape is #515 Masking Tape, Anchor Continental, Inc. Columbia, S.C.), with adhesive side out, were wrapped around the rotatable cylinder. The three strips were overlapped to achieve a tape backing having a total width of about 7". Six 1" wide fiber samples were wrapped onto the tape backing. The same or different yarn samples can be wound onto each tape backing. Each fiber or cord sample should be wound, however, such that there is no overlapping of fibers and no space between adjacent fibers. Typically, three strips of each fiber sample were prepared and tested.

The fibers were secured with 1" wide masking tape, and the strips were marked A, B, C, D, E, and F. The six wound samples were removed from the cylinder by cutting across the cylinder.

A 5"×7" piece of thermoplastic polymeric material to be tested, which has been milled to a specified thickness (0.250±0.20 inches), was cut. The mold surface which will be in contact with the fiber assembly was cleaned with n-heptane.

The preheated mold was removed from the press. The fiber samples were placed at the bottom mold plate with the masking tape backing face down, and the fibers facing up. A 1"×7" strip of aluminum foil was placed on the back edge of the fiber samples so that the fibers are perpendicular to the aluminum foil and about one inch of their length covers the aluminum foil strip. Each strip has a specified position in the press. The cleaned 5"×7" thermoplastic polymeric material slab was then on top on the fiber assembly. The preheated top mold plate was placed on top of the samples to form a sandwich of mold top plate, thermoplastic polymeric material compound, aluminum foil, yarn samples, tape and bottom plate. This sandwich is then placed in the preheated compression press and a pressure of about 125 tons is applied.

The mold assembly was removed from the press at the end of the cure time. It is important not to disturb the fiber composite while separating the pad from the mold plates. Typically, the pad was placed in cold water to expedite the cooling process. The pad was cooled to ambient temperature prior to marking the pad for identification.

The adhesion pad should sit for an extended period ("conditioning period"), e.g., overnight, prior to cutting into the 1"×5" strips for adhesion testing. As much of the aluminum foil strip as possible was removed to give a starting separation between the fiber sample and the thermoplastic polymeric material compound. The foil can be left in place if too difficult to remove. After conditioning, each 5"×7" thermoplastic polymeric material section was cut into six 1"×5" strips such that only one fiber to be tested is contained in each strip.

Each 1"×5" adhesion composite strip was tested on the Instron 4201 tensile/compression machine (Instron Corporation, Canton, Mass.) according to method 08 of the Instron Series IX Materials Testing™ Software.

TABLE IV

Materials for Tables I-III

| Material | Chemical Description | Supplier |
|---|---|---|
| Geon 121 (OxyVinyl 242) | Polyvinyl chloride | OxyVinyls |
| ThermChek 904 | Organo phospite allylphenols | Ferro |
| Paraplex G-62 | Epoxidized Soybean Oil | The C. P. Hall Company |
| Plasthall BBP | Butyl benzyl phthalate | The C. P. Hall Company |
| Paraplex A-8000 | Polyester adipate | The C. P. Hall Company |
| RX-13939 | RX-13804 40%, Resimene 3520 40%, N-Butanol 20% | The C. P. Hall Company |
| RX-13943 | Dibutyl dimerate- 43.5%/Resimene3520-43.5%/Butanol −13% | The C. P. Hall Company |
| Resimene 3520 | Methylated melamine, formaldehyde polymer | Solutia |
| Millathane 76 | Polyester polyurethane | TSE Industries |
| Rhenosin 260 | Aromatic hydrocarbon resin | RheinChemie |
| Stearic Acid | Stearic acid, rubber grade | The C. P. Hall Company |
| TAC | Triallyl cyanurate | Cytec |
| Hi Sil 233 | Hydrated amorphous silica | The C. P. Hall Company |

TABLE IV-continued

Materials for Tables I-III

| Material | Chemical Description | Supplier |
|---|---|---|
| Mistron Vapor | Hydrous magnesium silicate | Luzenac America |
| Epolene N-34 | Polyethylene wax | Eastman |
| Plasthall DBEEA | Dibutoxyethoxyethyl adipate | The C. P. Hall Company |
| Rhenopren EPS | Polyester based on vegetable fatty oils | RheinChemie |
| Varox DBPH-50 | 2,5-dimethyl-2,5-di(t-butyl peroxide)-hexane | R. T. Vanderbilt |
| RX-13928 | RX-13804-42.5%, Resimene 3520, 42.5%, 2EH-15% | The C. P. Hall Company |
| RX-13946 | Micro Cel E CSF 28%, RX13804, 36% Resimene 3520 36% | The C. P. Hall Company |
| RX-13845 | Micro Cel E CSF 28%, RX13804, 36% Cyrez CRA138M 36% | The C. P. Hall Company |
| RX-13804 | Di(2-ethylhexyl) dimerate (Empol 1016) | The C. P. Hall Company |
| RX-13977 | RX-13804, 35%, Resimene 3520, 35%, Glycidyl ether of 8,10 alcohol (from CVC Specialty Chemicals), 30% | The C. P. Hall Company |
| RX-13978 | RX-13804, 35%, Resimene 3520, 35%, Dimer Acid diglycidyl ester (from CVC Specialty Chemicals) 30% | The C. P. Hall Company |
| OV240F | Polyvinyl chloride | OxyVinyls |
| ThermChek SP0350 | Barium/zinc stearate | Ferro |
| Untreated Aramid Acordis Twaron 1008 | Untreated Aramid fiber | Beaver Mfg. Co. |
| Beaverloc 108 Polyester 174S | Treated polyester fiber | Beaver Mfg. Co. |
| Beaverloc 102 Twaron Aramid | treated Aramid fiber | Beaver Mfg. Co. |
| Untreated Polyester 174S | Untreated polyester fiber | Beaver Mfg. Co. |
| Untreated Nylon | Untreated nylon fiber | Beaver Mfg. Co. |
| Treated Nylon | Treated nylon fiber | Beaver Mfg. Co. |

The following Table V is a summary of the solvent solubilities of a representative adhesive resin, melamine (Resimene 3520) and a representative ester, RX-13804 (di-2-ethylhexyl dimerate) for use in selecting solvents capable of solubilizing both the ester and the resin in making a liquid solution of the adhesion promoter. The solubilities were only determined at 1:1 mixtures of solvent to dimerate/melamine. If both the samples were soluble in the solvent, the solutions were again mixed at a 1:1 ratio of dimerate+solvent to Melamine+solvent. The samples provide complete solubility of both dimerate ester and Melamine resin so long as the composition is at a 13% by weight or greater percent solvent level.

TABLE V

Melamine/Dimerate Solubilities Spot Checks

| Solvent | RX13804 | Melamine | RX13804 + Melamine |
|---|---|---|---|
| Xylene | S | S | S |
| 1,4-Dioxane | S | S | S |
| Toluene | S | S | S |
| Acetonitrile | I | S | I |
| Ethanol | I | S | I |
| n-Hexanol | S | S | S |
| Ethyl Acetate | S | S | S |
| N,N-Dimethylformamide | I | S | I |
| n-Butanol | S | S | S |
| 2-EH (2-ethylhexanol) | S | S | S |
| Methyl Ethyl Ketone | S | S | S |
| Methyl Isobutyl Ketone | S | S | S |
| Butyl Acetate | S | S | S |
| Chloroform | S | S | S |
| Carbon Tetrachloride | S | S | S |
| Hexane | S | I | I |
| Heptane | S | I | I |
| Isopropanol | S | S | S |
| Isodecyl alcohol | S | S | S |
| Isotridecyl alcohol | S | S | S |
| Ethylene glycol monobutyl ether | S | S | S |
| Dipropylene glycol monobutyl ether | S | S | S |

Melamine/Dimerate Solubilities with 2-EH

| Quantitative Sample | % RX13804 | % Melamine | % 2-EH | Appearance |
|---|---|---|---|---|
| 1 | 42.5 | 42.5 | 15.0 | Clear |
| 2 | 43.0 | 43.0 | 14.0 | Clear |
| 3 | 43.2 | 43.2 | 13.6 | Clear |
| 4 | 43.3 | 43.3 | 13.4 | Clear |
| 5 | 43.5 | 43.5 | 13.0 | Hazy (Insoluble) |

S = Soluble;
I = Insoluble

In order to homogeneously emulsify the ester and/or the resin components of the adhesion promoter in a water-based carrier, any suitable emulsifying/dispersing agents can be used that are capable of forming a stable emulsion. Since the esters have a very low polarity and the resins have a very high polarity, if both the ester and resin are emulsified in a water-based carrier, generally a combination of emulsifying agents is needed to provide a homogeneous, stable emulsion in water. It has been found that the water-based emulsions should have a hydrophile/lipophile balance (HLB) in the range of about 4 to about 5 for best emulsification. Particular combinations of emulsifying agents found to be especially providing a homogeneous, stable water-based emulsion of the dimerate esters and adhesive resin include a combination of an anionic metal stearate, e.g., potassium stearate for the ester, and a non-ionic sorbitan oleate for the adhesive resin, as shown in the following emulsion preparation guide:

| | | |
|---|---|---|
| RX-13804 | 49 | |
| Stearic acid | 0.2 | } K Stearate |
| KOH (45%) | 0.1 | |
| Cyrez CRA-138M | 48.7 | |
| Span80 (sorbitan oleate) | (2 to 6%) based on the weight of dimerate ester (RX-13804) | |

After adding Stearic acid, heat up to 90° C.; add KOH slowly while mixing, mix for 5 minutes, then cool the mixture down to around 50° C. Then add Cyrez, then Span80.

| Water-Based Emulsion Adhesion Promoter RX-13937 | | | |
|---|---|---|---|
| Composition Component | % by wt. | Chemical | Supplier |
| RX-13804 | 49.0 | Di-2-ethylhexyl dimerate | CP Hall |
| Stearic acid | 0.2 | tripled pressed Stearic acid | Witco |
| KOH (45%) | 0.1 | Potassium hydroxide 45% | Ashta |
| Cyrez CRA-138M | 48.7 | methylated melamine, formaldehyde polymer | Cytec |
| Span80 | 2.0 | sorbitan monooleate | Uniqema |

| Solution-Based Adhesion Promoter RX-13928 | | | |
|---|---|---|---|
| Composition Component | % by wt. | Chemical | Supplier |
| ester | 42.5 | Di-2-ethylhexyl dimerate | CP Hall |
| resin | 42.5 | methylated melamine formaldehyde resin | UCB |
| solvent | 15.0 | 2-ethylhexanol | Sunoco |

What is claimed is:

1. A thermoplastic polymeric material composition comprising a thermoplastic polymeric material selected from the group consisting of thermoplastic polymers, thermoplastic polymer alloys, and combinations thereof; and an adhesion promoter containing (1) an adhesive resin in an amount of about 0.1% to about 15% by weight, based on the weight of the thermoplastic polymeric material in the composition; and (2) an ester having formula I, II, III, IV or a combination of any two or more of said esters in an amount of about 0.1% to about 15% by weight, based on the weight of the thermoplastic polymeric material in the composition:

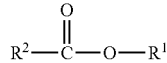

(I)

wherein $R^1$ is a $C_3$–$C_{24}$ alkyl radical, straight chain or branched, saturated or unsaturated containing 1 to 3 carbon-to-carbon double bonds; $R^2$ is a $C_6$–$C_{24}$ saturated fatty acid residue, or a $C_6$–$C_{24}$ unsaturated fatty acid residue having 1 to 6 carbon-to-carbon double bonds;

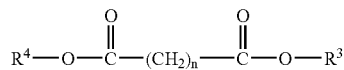

(II)

wherein n=3–24, and $R^3$ and $R^4$, same or different, are a $C_3$–$C_{24}$ alkyl radical, straight chain or branched, saturated or unsaturated containing 1 to 3 carbon-to-carbon double bonds;

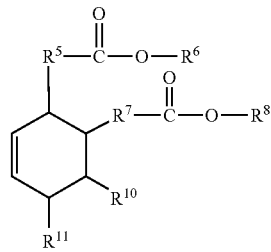

(III)

wherein $R^5$ and $R^7$, same or different, are a $C_3$–$C_{24}$ hydrocarbon chain, straight chain or branched, either saturated or having 1 to 6 carbon-to-carbon double bonds;

$R^6$ and $R^8$, same or different, are $C_3$–$C_{24}$ alkyl radical, straight chain or branched, saturated or unsaturated containing 1 to 3 carbon-to-carbon double bonds; and $R^{10}$ and $R^{11}$, same or different, are a $C_3$–$C_{24}$, saturated hydrocarbon chain, straight chain or branched; or an unsaturated $C_3$–$C_{24}$, hydrocarbon chain, straight chain or branched, having 1 to 6, carbon-to-carbon double bonds;

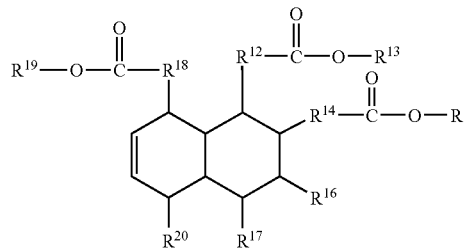

(IV)

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;

$R^{13}$, $R^{15}$ and $R^{19}$, same or different, are a $C_3$–$C_{24}$ alkyl, straight chain or branched, saturated or unsaturated containing 1 to 3 carbon-to-carbon double bonds; and $R^{16}$, $R^{17}$ and $R^{20}$, same or different, are a $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

2. A thermoplastic polymeric material composition in accordance with claim 1, wherein the ester is selected from the group consisting of formula I, II, III, IV, and a combination of any two or more of said esters:

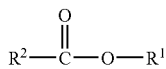  (I)

wherein $R^1$ is a $C_3$–$C_{18}$ alkyl radical, straight chain or branched, saturated or unsaturated containing 1 to 3 carbon-to-carbon double bonds; and $R^2$ is a $C_8$–$C_{18}$ saturated fatty acid residue, or a $C_8$–$C_{18}$ unsaturated fatty acid residue having 1 to 3 carbon-to-carbon double bonds;

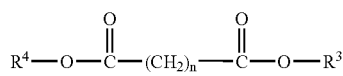  (II)

wherein n=6–18, and $R^3$ and $R^4$, same or different, are a $C_3$–$C_{18}$ alkyl radical, straight chain or branched, saturated or unsaturated containing 1 to 3 carbon-to-carbon double bonds;

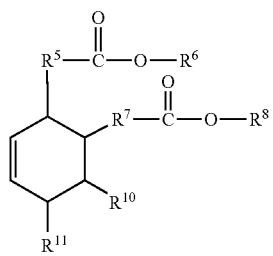  (III)

wherein $R^5$ and $R^7$, are a $C_6$–$C_{24}$ hydrocarbon chain, straight chain or branched; either saturated or having 1 to 3 carbon-to-carbon double bonds;

$R^6$ and $R^8$, same or different, are a $C_3$–$C_{18}$ alkyl radical, straight chain or branched, saturated or unsaturated containing 1 to 3 carbon-to-carbon double bonds; and $R^{10}$ and $R^{11}$, same or different, are a $C_3$–$C_{18}$, saturated hydrocarbon chain, straight chain or branched; or an unsaturated hydrocarbon chain, straight chain or branched, containing 1 to 3 carbon-to-carbon double bonds;

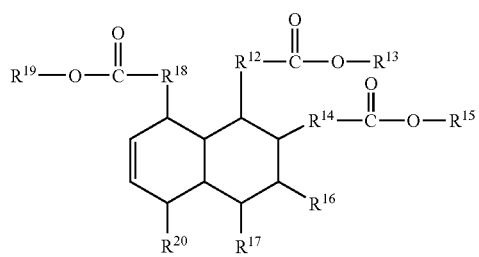  (IV)

wherein $R^{12}$, $R^{14}$ and $R^{18}$, same or different, are a $C_8$–$C_{18}$, hydrocarbon chain, straight chain or branched, either saturated or having 1 to 3 carbon-to-carbon double bonds;

$R^{13}$, $R^{15}$ and $R^{19}$, same or different, are a $C_6$–$C_{18}$ alkyl radical, straight chain or branched, saturated or unsaturated containing 1 to 3 carbon-to-carbon double bonds; and $R^{16}$, $R^{17}$ and $R^{20}$, same or different, are a $C_6$–$C_{18}$ saturated hydrocarbon chain, straight chain or branched; or an unsaturated $C_6$–$C_{18}$ hydrocarbon chain, straight chain or branched, containing 1 to 3 carbon-to-carbon double bonds.

3. The composition of claim 1, wherein the adhesive resin is a condensation product of a methylene acceptor and a methylene donor.

4. The composition of claim 3, wherein the adhesive resin is selected from the group consisting of phenol-formaldehyde, melamine-formaldehyde; naphthol-formaldehyde; polyepoxide; a reaction product of triallyl cyanurate, resorcinol, and formaldehyde; a reaction product of p-chlorophenol, resorcinol, and formaldehyde; a copolymer of styrene, butadiene, and 2-vinylpyridine; and mixtures thereof.

5. The composition of claim 4, wherein the phenol-formaldehyde resin is resorcinol-formaldehyde.

6. The composition of claim 4, wherein the phenol-formaldehyde resin is resorcinol-formaldehyde; and the melamine-formaldehyde resin is N-(substituted oxymethyl) melamine-formaldehyde.

7. The composition of claim 1, wherein the adhesive resin comprises a melamine, acetoguanamine, benzoguanamine, cyclohexylguanamine or glycoluril monomer or oligomer of these monomers, which have been substituted at two or more positions on the monomer or on each unit of the oligomer with vinyl terminated radicals, the vulcanizable rubber composition being free of resorcinol.

8. The composition of claim 7, wherein at least one of the adhesive resins has been further substituted at one or more positions with a radical which comprises carbamoylmethyl or amidomethyl.

9. A composition of claim 7, wherein the adhesive resin is selected from compounds of the formula:

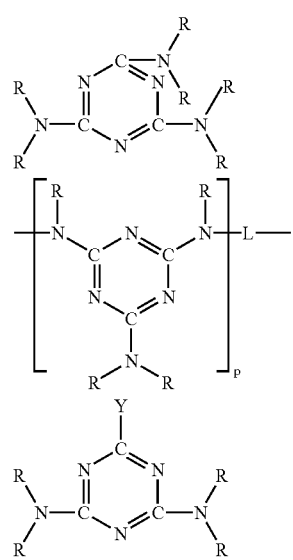

-continued

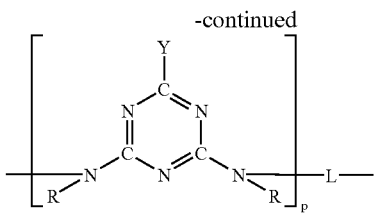

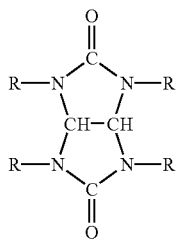

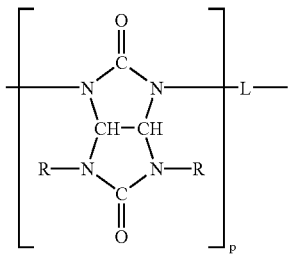

and positional isomers thereof,
wherein, in each monomer and in each polymerized unit of the oligomers, Y is selected from methyl, phenyl and cyclohexyl, and, on average, at least two R are —CH$_2$—R$^1$, and any remaining R are H, and at least 2 R$^1$ are radicals selected from

CH$_2$=C(R$^2$)—C(O)—O—,

CH$_2$=C(R$^2$)—C(O)—Z,

CH$_2$=C(R$^2$)—C(O)—NH—, and

CH$_2$=C(R$^2$)—CH$_2$—O—, wherein R$^2$ is hydrogen or C$_1$–C$_{18}$ alkyl, and Z is a radical selected from

—O—CH$_2$—CH$_2$—O—,

—O—CH$_2$—CH(CH$_3$)—O—,

—O—CH$_2$—CH$_2$—CH$_2$O—, and

—O—CH(C$_2$H$_5$)—O—, and any remaining R$^1$ radicals are selected from

—O—R$^3$,

—NH—C(O)—OR$^4$, and

—NH—C(O)—R$^4$, and wherein R$_3$ is hydrogen or R$_4$, and R$_4$ is a C$_1$–C$_{18}$ alkyl, alicyclic, hydroxyalkyl, alkoxyalkyl or aromatic radical, and in the oligomers, P is 2 to about 10, and L is methylene or the radical

—CH$_2$—O—CH$_2$—.

10. The composition of claim 9, wherein on average at least one R$^1$ in each monomer or in each oligomerized unit of the adhesive resin is:

—NH—C(O)—OR$^4$ wherein R$^4$ is as defined in claim 8.

11. The composition of claim 10, wherein the adhesive resin is a compound of the formula

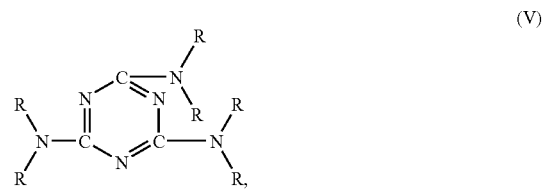

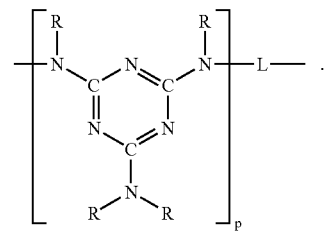

12. The composition of claim 11, wherein in the adhesive resin formulas, at least one R radical in each monomer or in each oligomerized unit is

—CH$_2$—NH—C(O)—OR$^4$ wherein R$^4$ is a C$_1$–C$_{18}$ alkyl, alicyclic, hydroxyalkyl, alkoxyalkyl or aromatic radical.

13. The composition of claim 11, wherein at least two R radicals are selected from

CH$_2$=C(CH$_3$)—C(O)O—C$_3$H$_6$—O—CH$_2$— and

CH$_2$=CH$_2$—C(O)O—C$_2$H$_4$—O—CH$_2$— and at least one R radical is selected from

CH$_2$—NH—C(O)—O—CH$_3$ and

CH$_2$—NH—C(O)—O—C$_3$H$_7$.

14. The composition of claim 9, further comprising an additional additive selected from hydroxymethylated and alkoxymethylated derivatives of melamine, acetoguanamine, benzoguanamine, cyclohexylguanamine and glycoluril and their oligomers.

15. The composition of claim 7, wherein the adhesive resin comprises melamine or an oligomer of melamine.

16. The composition of claim 7, wherein the adhesive resin comprises acetoguanamine or an oligomer of acetoguanamine.

17. The composition of claim 7, wherein the adhesive resin comprises benzoguanamine or an oligomer of benzoguanamine.

18. The composition of claim 7, wherein the adhesive resin comprises cyclohexylguanamine or an oligomer of cyclohexylguanamine.

19. The composition of claim 1, wherein the adhesive resin is a self-condensing alkylated triazine resin selected from the group consisting of (i), (ii), and (iii):
(i) a self-condensing alkylated triazine resin having at least one of imino or methylol functionality and represented by formula (VII)

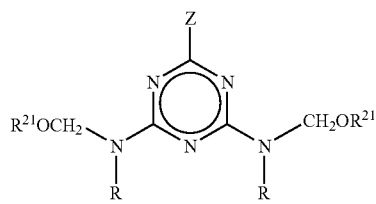

(VII)

(ii) an oligomer of (i), or
(iii) a mixture of (i) and (ii), wherein
Z is —N(R)(CH$_2$OR$^{21}$), aryl having 6 to 10 carbon atoms, alkyl having 1 to 20 carbon atoms or an acetyl group,
each R is independently hydrogen or —CH$_2$OR$^{21}$, and
each R$^{21}$ is independently hydrogen or an alkyl group having 1 to 12 carbon atoms,
provided that at least one R is hydrogen or —CH$_2$OH and at least one R$^{21}$ is selected from the alkyl group; and
wherein the thermoplastic polymeric material composition is substantially free of methylene acceptor coreactants.

20. The composition of claim 19, wherein at least one R group is hydrogen.

21. The composition of claim 20, wherein at least one R$^{21}$ group is a lower alkyl group having 1 to 6 carbon atoms.

22. The composition of claim 21, wherein the adhesive resin comprises melamine, benzoguanamine, cyclohexylguanamine, or acetoguanamine, or an oligomer thereof.

23. The composition of claim 21, wherein Z is —N(R)(CH$_2$OR$^{21}$).

24. The composition of claim 1, wherein the ester has the formula II and comprises a saturated diester formed by the reaction of sebacic acid and a C$_6$–C$_{24}$ alcohol, straight chain or branched, saturated or unsaturated containing 1 to 3 carbon-to-carbon double bonds.

25. The composition of claim 24, wherein the alcohol is 2-ethylhexyl alcohol, and the ester has the following formula:

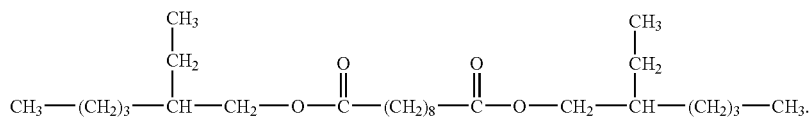

26. The composition of claim 1, wherein the ester is an unsaturated diester formed by the reaction of a C$_{36}$ dimer acid and a C$_3$–C$_{18}$ alcohol, straight chain or branched, saturated or unsaturated containing 1 to 3 carbon-to-carbon double bonds.

27. The composition of claim 26, wherein the alcohol is 2-ethylhexyl alcohol.

28. The composition of claim 26, wherein the alcohol is tridecyl alcohol.

29. The composition of claim 26, wherein the alcohol is oleyl alcohol.

30. The composition of claim 1, wherein the ester comprises the following dimer acid reacted with a C$_3$–C$_{24}$ alcohol:

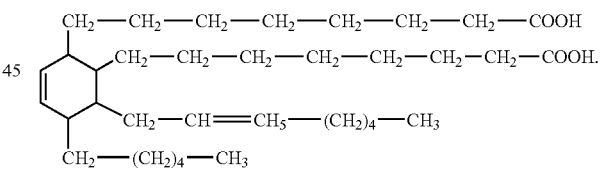

31. The composition of claim 1, wherein the ester comprises the following dimer acid reacted with a C$_3$–C$_{24}$ alcohol:

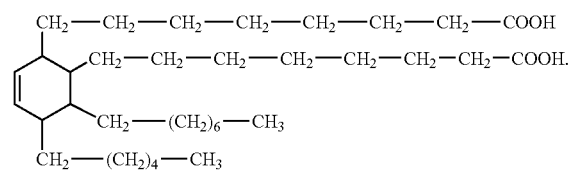

32. The composition of claim 1, wherein the ester comprises the following dimer acid reacted with a C$_3$–C$_{24}$ alcohol:

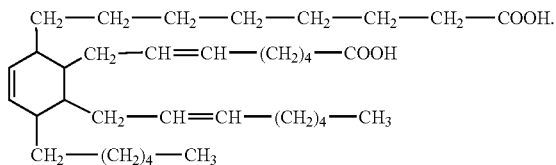

33. The composition of claim 1, wherein the ester is the reaction product of a $C_3$–$C_{24}$ alcohol with a tricarboxylic acid, having the following formula:

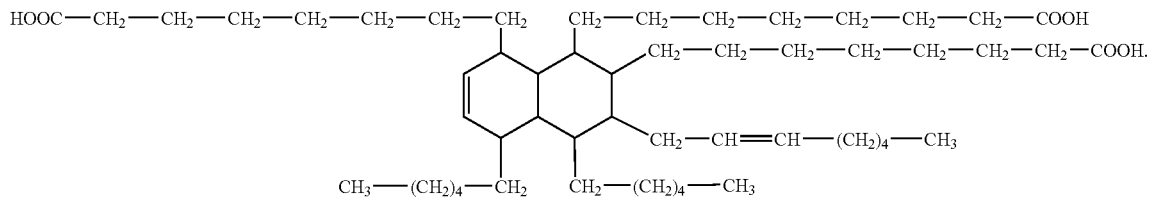

34. The composition of claim 1, wherein the ester is a combination of compounds of formula I, II, III, and IV.

35. The composition of claim 34, wherein the ester is a reaction product of a $C_3$–$C_{24}$ alcohol straight chain or branched, saturated or unsaturated having 1 to 3 carbon-to-carbon double bonds, with a dimer acid having CAS #61788-89-4.

36. The composition of claim 35, wherein the alcohol is 2-ethylhexyl alcohol.

37. The composition of claim 35, wherein the alcohol is a tridecyl alcohol.

38. The composition of claim 35, wherein the alcohol is an oleyl alcohol.

39. The composition of claim 1, wherein the adhesion promoter is a liquid selected from the group consisting of a solvent solution and a water-based emulsion.

40. The composition of claim 39, wherein the adhesion promoter is a solvent solution comprising 2-ethylhexyl alcohol.

41. The composition of claim 1, wherein the adhesion promoter is mixed with a solid, inert carrier.

42. The composition of claim 41, wherein the solid, inert carrier is calcium silicate.

43. The composition of claim 1, further comprising a reactive diluent in an amount of about 0.5% to about 50% by weight, based on the total weight of the adhesion promoter.

44. The composition of claim 43, wherein the reactive diluent is a monomer selected from the group consisting of (1) a glycidyl ether; (2) a diglycidyl ether; (3) an aliphatic, straight chain epoxide; (4) an epoxidized vegetable oil; (5) a cycloaliphatic epoxy; (6) a glycidyl ester; (7) a diglycidyl ester; and any combination thereof.

45. A cord-reinforced article of manufacture comprising a plurality of cords selected from polymeric cords, metal cords, glass cords, and a combination thereof, adhered to the thermoplastic polymeric material composition of claim 1.

46. The composition of claim 1, wherein the $R^2$, $R^5$, $R^7$, $R^{12}$, $R^{14}$ are fatty acid residues derived from animal or vegetable fatty acids.

47. The composition of claim 46, wherein the fatty acids are selected from the group consisting of butter; lard; tallow; grease; herring; menhaden; pilchard; sardine; babassu; castor; coconut; corn; cottonseed; jojoba; linseed; oiticia; olive; palm; palm kernel; peanut; rapeseed; safflower; soya; sunflower; tall; tung; and mixtures thereof.

48. The composition of claim 47, wherein the fatty acid residues are selected from the group consisting of hexanoic; octanoic; decanoic; dodecanoic; 9-dodecenoic; tetradecanoic; 9-tetradecenoic; hexadecanoic; 9-hexadecenoic; octadecanoic; 9-octadecenoic; 9-octadecenoic, 12-hydroxy; 9, 12-octadecadienoic; 9, 12, 15-octadecatrienoic; 9, 11, 13-octadecatrienoic; 9, 11, 13-octadecatrienoic, 4-oxo; octadecatetrenoic; eicosanoic; 11-eicosenoic; eicosadienoic; eicosatrienoic; 5, 8, 11, 14-eicosatetraenoic; eicosapentaenoic; docosanoic; 13-docosenoic; docosatetraenoic; 4, 8, 12, 15, 21-docosapentaenoic; docosahexaenoic; tetracosenoic; and 4, 8, 12, 15, 21, 21-tetracosahexaenoic.

49. A method of increasing the adhesion of a thermoplastic polymeric material composition to a polymer, glass, or metal substrate, said thermoplastic polymeric material composition comprising a thermoplastic polymeric material selected from the group consisting of thermoplastic polymers, thermoplastic polymer alloys, and combinations thereof, and an adhesive resin, comprising adding to said thermoplastic polymeric material composition, in an amount of about 0.1% to 15% by weight, based on the weight of the rubber, an ester having formula I, II, III, IV, or mixtures thereof:

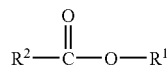

(I)

wherein $R^1$ is a $C_3$–$C_{24}$ alkyl radical, straight chain or branched, saturated or unsaturated containing 1 to 3 carbon-to-carbon double bonds; $R^2$ is a $C_6$–$C_{24}$ saturated fatty acid residue, or a $C_6$–$C_{24}$ unsaturated fatty acid residue having 1 to 6 carbon-to-carbon double bonds;

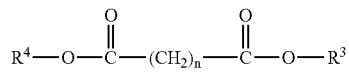

(II)

wherein n=3–24 and $R^3$ and $R^4$, same or different, are a $C_3$–$C_{24}$ alkyl radical, straight chain or branched;

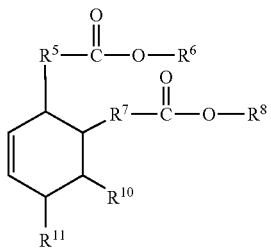

(III)

wherein $R^5$ and $R^7$, same or different, are a $C_3$–$C_{24}$ hydrocarbon chain, straight chain or branched, either saturated or having 1 to 6 carbon-to-carbon double bonds;

$R^6$ and $R^8$, same or different, are a $C_3$–$C_{24}$ alkyl radical, straight chain or branched; and $R^{10}$ and $R^{11}$, same or different, are a $C_3$–$C_{24}$, saturated hydrocarbon chain, straight chain or branched; or an unsaturated $C_3$–$C_{24}$, hydrocarbon chain, straight chain or branched, having 1 to 6 carbon-to-carbon double bonds;

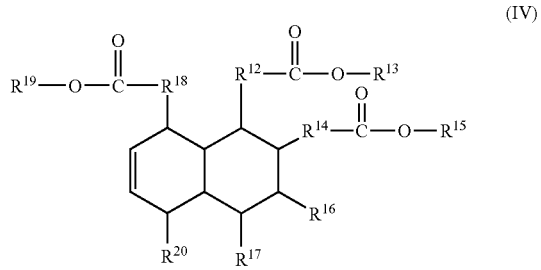

(IV)

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;

$R^{13}$, $R^{15}$ and $R^{19}$, same or different, are $C_3$–$C_{24}$ alkyl radical, straight chain or branched, saturated or unsaturated containing 1 to 3 carbon-to-carbon double bonds; and $R^{16}$, $R^{17}$ and $R^{20}$, same or different, are $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

50. The method of claim 49, wherein the substrate is a plurality of cords.

51. The method of claim 49, wherein the substrate is a polymeric sheet or fabric.

52. The method of claim 49, wherein the substrate is metal flat stock material.

53. The method of claim 49, wherein the adding comprises adding a liquid comprising the adhesive resin and the ester having Formula I, II, III, IV, or mixtures thereof, and the liquid is selected from the group consisting of a solvent solution and a water-based emulsion.

54. The method of claim 53, wherein the liquid is a solvent solution comprising 2-ethylhexyl alcohol.

55. The method of claim 53, wherein the liquid is a solvent solution further comprising a reactive diluent in an amount of about 0.5% to about 50% by weight, based on the total weight of the adhesive resin and the ester having Formula I, II, III, IV, or mixtures thereof.

56. The method of claim 55, wherein the reactive diluent is a monomer selected from the group consisting of (1) a glycidyl ether; (2) a diglycidyl ether; (3) an aliphatic, straight chain epoxide; (4) an epoxidized vegetable oil; (5) a cycloaliphatic epoxy; (6) a glycidyl ester; (7) a diglycidyl ester; and any combination thereof.

57. The method of claim 49, wherein the adding comprises adding a mixture of the adhesive resin and the ester having Formula I, II, III, IV, or mixtures thereof, and a solid, inert carrier.

58. The method of claim 49, wherein the thermoplastic polymeric material is heated to a temperature sufficient to melt the thermoplastic material.

* * * * *

UNITED STATES PATENT AND TRADEMARK OFFICE
CERTIFICATE OF CORRECTION

PATENT NO. : 7,122,592 B2 Page 1 of 1
APPLICATION NO. : 10/706196
DATED : October 17, 2006
INVENTOR(S) : Gary Wentworth et al.

It is certified that error appears in the above-identified patent and that said Letters Patent is hereby corrected as shown below:

In the Claims:

At Column 30, line 37, Claim 1 "6," should be -- 6 --.

At Column 34, line 21, Claim 11 (between Formula V and Formula VI), please add -- or --.

At Column 38, line 28, Claim 11 "4, 8, 12, 15, 21-docosapentaenoic" should be --4, 8, 12, 15, 19-docosapentaenoic --.

At Column 38, line 29, Claim 48 "4, 8, 12, 15, 21, 21-tetracosahexaenoic" should be --4, 8, 12, 15, 18, 21-tetracosahexaenoic --.

Signed and Sealed this

Fourth Day of December, 2007

JON W. DUDAS
*Director of the United States Patent and Trademark Office*